(12) United States Patent
O'Sullivan et al.

(10) Patent No.: US 12,542,058 B1
(45) Date of Patent: *Feb. 3, 2026

(54) DYNAMIC ACCESS AND EGRESS OF RAILROAD RIGHT OF WAY

(71) Applicant: Cavnue Technology, LLC, Arlington, VA (US)

(72) Inventors: Mathew O'Sullivan, Evanston, IL (US); David Kiley, Washington, DC (US)

(73) Assignee: Cavnue Technology, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,136

(22) Filed: Feb. 16, 2024

Related U.S. Application Data

(63) Continuation of application No. 17/980,489, filed on Nov. 3, 2022, now Pat. No. 11,941,980.

(51) Int. Cl.
*G08G 1/04* (2006.01)
*B61L 25/02* (2006.01)
(Continued)

(52) U.S. Cl.
CPC ...... *G08G 1/096725* (2013.01); *B61L 25/023* (2013.01); *B61L 27/40* (2022.01);
(Continued)

(58) Field of Classification Search
CPC ........... G08G 1/096725; G08G 1/0116; G08G 1/0141; G08G 1/0145; G08G 1/096775;
(Continued)

(56) References Cited

U.S. PATENT DOCUMENTS 6,263,799 B1    7/2001  Pardes
7,302,319 B2    11/2007 Wu
(Continued)

FOREIGN PATENT DOCUMENTS

CN        102146650      8/2011
CN        102616251      12/2014
WO        WO 2008116794  10/2008

OTHER PUBLICATIONS

Cavnue LLC, "Autonomous Trucking on Rail Rights of Way," Jul. 2021, 10 pages.
(Continued)

*Primary Examiner* — Peter D Nolan
*Assistant Examiner* — Demetra R Smith-Stewart
(74) *Attorney, Agent, or Firm* — Fish & Richardson P.C.

(57) ABSTRACT

Methods, systems, and apparatus, including computer programs encoded on computer storage media, for allowing vehicles access or egress from a dedicated roadway. In some implementations, a system includes a server, an interface, and sensors. The interface receives data from a railroad system that manages a railroad running parallel to a first roadway. The sensors are positioned in a location relative to the first and second roadway. Each sensor can detect vehicles on the second roadway. For each detected vehicle, each sensor can generate first sensor data based on the detected vehicle and the data received at the interface. Second sensor data can be generated based on activities on the first roadway. Observational data can be generated based on the first and second sensor data. An instruction can be determined to allow the detected vehicle access to the first roadway. The instruction can be transmitted to the detected vehicle.

20 Claims, 3 Drawing Sheets

(51) Int. Cl.
  B61L 27/40 (2022.01)
  B61L 29/08 (2006.01)
  G08G 1/00 (2006.01)
  G08G 1/01 (2006.01)
  G08G 1/056 (2006.01)
  G08G 1/0967 (2006.01)
  G08G 1/16 (2006.01)

(52) U.S. Cl.
  CPC ......... *G08G 1/0116* (2013.01); *G08G 1/0141* (2013.01); *G08G 1/0145* (2013.01); *G08G 1/096775* (2013.01); *G08G 1/164* (2013.01); *G08G 1/166* (2013.01); *G08G 1/167* (2013.01)

(58) Field of Classification Search
  CPC ........ G08G 1/164; G08G 1/166; G08G 1/167; B61L 25/023; B61L 27/40
  See application file for complete search history.

(56) References Cited

U.S. PATENT DOCUMENTS

| | | | |
|---|---|---|---|
| 7,832,691 | B2 | 11/2010 | Reibeling et al. |
| 8,157,219 | B2 | 4/2012 | Ashraf et al. |
| 9,150,229 | B2 | 10/2015 | Steffen et al. |
| 9,415,783 | B2 | 8/2016 | Kissel |
| 9,802,630 | B2 | 10/2017 | Bartolotti |
| 9,950,722 | B2 | 4/2018 | Kumar et al. |
| 10,899,350 | B2 | 1/2021 | Schoenly |
| 10,899,374 | B2 | 1/2021 | Hilleary |
| 11,138,873 | B1 | 10/2021 | Clifford |
| 11,623,675 | B1 | 4/2023 | O'Sullivan et al. |
| 12,062,283 | B2 * | 8/2024 | Kiley ............... G08G 1/096725 |
| 2005/0088318 | A1 * | 4/2005 | Liu ..................... G08G 1/0965 340/995.13 |
| 2008/0185482 | A1 | 8/2008 | Ghigliotti |
| 2013/0194423 | A1 | 8/2013 | Baines et al. |
| 2013/0200223 | A1 | 8/2013 | Alexander et al. |
| 2013/0289805 | A1 | 10/2013 | Makkinejad |
| 2016/0231746 | A1 | 8/2016 | Hazelton et al. |
| 2017/0213458 | A1 | 7/2017 | Gordon et al. |
| 2018/0018888 | A1 | 1/2018 | Townsend |
| 2018/0208223 | A1 | 7/2018 | Israelsson et al. |
| 2020/0255033 | A1 | 8/2020 | Matsunaga et al. |
| 2021/0142684 | A1 | 5/2021 | Hilleary |
| 2021/0362735 | A1 * | 11/2021 | Nagao ................... H04L 9/3263 |
| 2022/0137640 | A1 * | 5/2022 | Geitz ................... G05D 1/0022 701/24 |
| 2023/0024393 | A1 | 1/2023 | Kiley et al. |

OTHER PUBLICATIONS dot.alaska.gov [online], "Enjoy the unique experience of a trip to Whittier, Alaska, driving the longest combined vehicle-railroad tunnel in North America!" Sep. 28, 2013, retrieved on Aug. 9, 2022, retrieved from URL<https://dot.alaska.gov/creg/whittiertunnel/>, 2 pages.

* cited by examiner

DYNAMIC ACCESS AND EGRESS OF RAILROAD RIGHT OF WAY

CROSS REFERENCE TO RELATED APPLICATION

This application is a continuation of U.S. application Ser. No. 17/980,489, filed Nov. 3, 2022, the contents of which are incorporated by reference herein.

TECHNICAL FIELD

This specification generally relates to road surveillance, and one particular implementation relates to enabling access and egress for a dedicated roadway that includes a parallel railroad.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this application is related to a system that dynamically determines whether to allow autonomous vehicles, e.g., autonomous trucks, access or egress for a dedicated roadway. The system can include a main roadway that enables the autonomous vehicles access to the dedicated roadway and egress from the dedicated roadway at designated points along the autonomous vehicles' traversal. Specifically, the system can facilitate the autonomous vehicles' access to the dedicated roadway, can facilitate the autonomous vehicles' traversal on the dedicated roadway, and can facilitate the autonomous vehicles' egress from the dedicated roadway to the main roadway based on various sensor data. The main roadway can be separate from the dedicated roadway. At designated points along the autonomous vehicle's traversal of the dedicated roadway, the autonomous vehicle can move to the main roadway, and vice versa. In some implementations, the system can facilitate the movement of the autonomous vehicle along these roadways in a safe manner.

In some implementations, the system can monitor various train specific information and roadway specific information to determine whether the autonomous vehicle can gain access to the dedicated roadway or should egress the dedicated roadway. For example, the system can analyze railroad system information, characteristics about one or more trains currently traversing the railroad, characteristics about one or more trains traversing the railroad in the future, and current vehicular activity on the dedicated roadway to determine whether to allow autonomous vehicles with access to the dedicated roadway or enabling egress from the dedicated roadway. However, before enabling the autonomous vehicles with access or egress from the dedicated roadway, the system can de-conflict with (i) trains traversing the dedicated roadway, (ii) detected activities that may interfere with vehicle and railway traffic, and (iii) other issues that may affect the dedicated roadway. Based on the de-confliction, the system can dynamically open or close the dedicated roadway for autonomous vehicles.

In some implementations, the system can protect the autonomous vehicles from accessing the dedicated roadway when they seek to access the dedicated roadway. Similarly, the system can protect the autonomous vehicles from hindering railroad or other traffic movement along the dedicated roadway by instructing the autonomous to move off the dedicated roadway to the main roadway. In some examples, the dedicated roadway can run in parallel next to the railroad. In some examples, the railroad can run over top of the dedicated roadway. In both of these examples, the system can ensure that the autonomous vehicles do not interfere with railroad traffic and the trains traversing the railroad do not interfere with the autonomous vehicles traffic.

The system can charge a toll or another fee to the autonomous vehicle that accesses the dedicated roadway. The charged tolls can be used to generate revenue for a railroad operator, e.g., potentially at a high operating margin than what the railroad is typically able to charge for railway operation—without materially adversely impacting the existing railway business. In this manner, introducing tolled autonomous freight infrastructure can be accretive to the value of the railroad right of way.

For example, a railroad may include the Lehigh Railway located in Pennsylvania, which is a short-line railroad that covers 56 miles. The Lehigh Railway connects between the Reading Blue Mountain and the Northern Railroad along the Susquehanna River. In some cases, the Lehigh Railway can run anywhere between ten to thirty trains per day. However, this utilization can fluctuate. A parallel roadway that enables toll charging of autonomous vehicles carrying goods, e.g., the dedicated roadway, that may not otherwise travel on the Lehigh Railway unlocks an ancillary source of revenue, offsetting days when the railroad is underutilized.

The system described in this application can support the safe movement of autonomous vehicles on railroad rights of way and charge a toll for autonomous vehicles to operate on or accessing the dedicated roadway. By charging a toll for autonomous vehicles to move goods from points A to point B on the dedicated roadway that may include the railroad, the railroad operator can unlock incremental value at potentially accretive margins versus when operating as a railroad alone. At the same time, within the autonomous trucking, for example, market, there are significant risks to deploying autonomous trucks on active roadways due to safety issues, complexity risks, and operational challenges, to name a few examples.

By having a dedicated roadway that connects a key freight corridor that runs in parallel to a railroad right of way (or coincides with the railroad right of way), a significant advantage exists for autonomous freight operators for deploying autonomous trucks within a controlled operating environment that improves reliability, safety, and an ability for autonomous trucks to move goods commercially and at scale. As a result, by providing a parallel-dedicated roadway for autonomous trucking, the system can convert legacy underutilized railroad right of way assets into advance freight corridors that deliver right of way monetization and increase value for railroad operators while at the same time, delivering improved and accelerated deployment of autonomy for trucking and other autonomous vehicle fleets.

In some implementations, the system can incorporate various sensors placed in a longitudinal manner along the main roadway and the dedicated roadway for monitoring the vehicles, their position, their movement amongst other vehicles, and for charging a toll on the vehicles for using the parallel roadway. The sensors can be placed on both sides of the dedicated roadway and the main roadway. The sensors can communicate with one another, communicate with one or more trains on the railroads, communicate with the autonomous vehicles, and communicate with an external central server, to name some examples. Each sensor can include their respective field of view for monitoring a designated area on the parallel roadway and roadway. These sensors can be spaced at a predetermined distance apart from one another alongside the various roadways. The sensors can include a combination of LIDAR systems, high definition (HD) video cameras, weather monitoring devices, a RADAR system, a Cellular Vehicle-to-Everything (C-V2X) system, and a Wi-Fi system, to name a few examples.

The sensors can, for example, generate observations regarding road actors, e.g., vehicles, objects, or people, traversing the various roadways. The sensors can calculate characteristics about the vehicular traffic, e.g., vehicle dynamics, each relating to the vehicles on the dedicated roadway. The sensors can identify an object as the object enters the sensors' field of view. Based on the identification of the object, the sensors can further describe a location of the vehicles along the roadway, an environment surrounding the vehicle, a speed of the vehicle, a relationship of the vehicle to another vehicle, e.g., vehicle headway describing distance and time between two moving vehicles, and others, to name some examples.

In some implementations, the sensors can monitor and analyze the dynamics of the vehicles on each of the roadways to determine whether the vehicles can access the dedicated roadway or whether the vehicles cannot access the dedicated roadway. Specifically, the sensors monitoring the main roadway can determine a current location of the vehicle on the main roadway. In response to determining the current location of the vehicle on the main roadway, the sensors monitoring the main roadway can determine whether that vehicle can access the dedicated roadway. Based on the location of the vehicle, the sensors monitoring the main roadway can communicate with one or more sensors monitoring the dedicated roadway to identify whether activity exists on the dedicated roadway. The activity can include, for example, an accident on the dedicated roadway, reduction in lane markings appears on the dedicated roadway, a construction zone on the dedicated roadway, a derailed train on the dedicated roadway, a train traversing the dedicated roadway, a train traversing a railroad towards or away from the dedicated roadway, and other activity on the dedicated roadway. The other activity can include activity occurring on the main roadway.

In some implementations, the sensors monitoring the main roadway can select one or more sensors monitoring the dedicated roadway to provide activity data on the dedicated roadway. Specifically, the sensors that detected the vehicle can detect a geographical position of that vehicle on the main roadway. In response, the sensors monitoring the main roadway can select and communicate with one or more sensors that monitor the dedicated roadway based on their position to provide activity data. For example, the sensors monitoring the main roadway can select one or more sensors monitoring the dedicated roadway based on their position being after the geographical position on the dedicated roadway along a direction of travel on the main roadway and the dedicated roadway. In this manner, the sensors monitoring the main roadway can obtain activity data from sensors who are located at a position ahead of the geographical position of the detected vehicle. This sensor data enables the sensors monitoring the main roadway to determine whether activity on the dedicated roadway lies ahead for the detected vehicle seeking to transition to the dedicated roadway. In some examples, the sensors monitoring the main roadway may obtain sensor data from all sensors monitoring the dedicated roadway. This will be further described below.

If the obtained sensor data indicates that no activity lies ahead or activity that does not create disruptions to the railroad or vehicular traffic on the dedicated roadway, then the sensors monitoring the main roadway can generate an instruction that indicates the detected vehicle can transition to the dedicated roadway. If the obtained sensor data indicates that activity does lie ahead or activity does create some disruptions to the railroad or to the vehicular traffic on the dedicated roadway, the sensors monitoring the main roadway can generate an instruction that indicates the detected vehicle is not allowed to transition to the dedicated roadway. In response, these sensors monitoring the main roadway can transmit the generated instruction to the vehicle indicating whether they can access or not access the dedicated roadway. In some examples, a similar process can exist for instructing these vehicles to egress from the dedicated roadway.

In one general aspect, a method is performed by one or more processors. The method includes: receiving, at an interface system, data from a railroad system that manages a railroad running parallel to a first roadway; detecting, by each sensor in a plurality of sensors positioned in a fixed location relative to the first roadway and a second roadway, one or more autonomous vehicles in a first field of view on the second roadway, and for each detected autonomous vehicle: generating first sensor data for the detected autonomous vehicle based on the detected autonomous vehicle on the second roadway and the data received at the interface system from the railroad system; generating second sensor data based on one or more sensors of the plurality of sensors monitoring activities on the first roadway; generating observational data based on the first sensor data and the second sensor data; determining an instruction indicating whether to allow the detected autonomous vehicle to access the first roadway based on the generated observational data; and transmitting the instruction to the detected autonomous vehicle while the detected autonomous vehicle traverses the second roadway.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes displaying, by the interface system, data related to the railroad that traverses in parallel to the first roadway and one or more trains traverse the railroad, the data comprising a number of the one or more trains, a direction of the one or more trains traveling on the railroad, and a number of railroads.

In some implementations, the method includes displaying, by the interface system, data related to that railroad that traverses on the first roadway and one or more trains traverse the railroad.

In some implementations, the autonomous vehicles that traverse the first roadway and the second roadway comprise autonomous trucks.

In some implementations, the first roadway is the dedicated lane proximate to the second roadway and the first roadway comprises one or more access points to the second roadway through one or more exits of the first roadway.

In some implementations, the first roadway is the dedicated lane proximate to the second roadway and the second roadway comprises one or more access points to the first roadway through one or more exits of the second roadway.

In some implementations, the method further includes: acquiring, by the plurality of sensors, first sensor data of the autonomous vehicles traversing the second roadway prior to accessing the one or more access points of the second roadway; detecting, by the plurality of sensors, an identity for each of the autonomous vehicles from the first sensor data; in response to detecting the identity for each of the autonomous vehicles, generating, by the plurality of sensors, the second sensor data based on the one or more sensors of the plurality of sensors monitoring activity on the first roadway; generating, by the plurality of sensors, the observational data based on the identity for each of the autonomous vehicles and the second sensor data; determining, by the plurality of sensors, the instruction indicating whether to allow each of the detected autonomous vehicle to access the second roadway based on the generated observational; and transmitting, by the plurality of sensors, the instruction to the detected autonomous vehicle prior to accessing the one or more access points of the second roadway.

In some implementations, the method further includes: acquiring, by the plurality of sensors, first sensor data of the autonomous vehicles traversing the second roadway after passing at least one of the one or more access points of the second roadway; detecting, by the plurality of sensors, an identity for each of the autonomous vehicles from the first sensor data; in response to detecting the identity for each of the autonomous vehicles, generating, by the plurality of sensors, the second sensor data based on the one or more sensors of the plurality of sensors monitoring activity on the first roadway; generating, by the plurality of sensors, the observational data based on the identity for each of the autonomous vehicles and the second sensor data; determining, by the plurality of sensors, the instruction indicating whether to allow each of the detected autonomous vehicle to access the second roadway based on the generated observational; and transmitting, by the plurality of sensors, the instruction to the detected autonomous vehicle after passing the least one of the one or more access points of the second roadway.

In some implementations, the method further includes: in response to acquiring the first sensor data of the autonomous vehicles traversing the second roadway after passing the at least one of the one or more access points, selecting, by the plurality of sensors, the one or more sensors monitoring the activity on the first roadway to generate the second sensor data, the one or more sensors being selected based on a location of the one or more sensors proximate to the first roadway, the position being after a location of the detected autonomous vehicles along a direction of travel of the second roadway.

In some implementations, the method further includes: generating, by the plurality of sensors, the second sensor data based on the one or more sensors of the plurality of sensors monitoring the activities on the second roadway, the activities comprising (i) an accident on the first roadway, (ii) reduced lane markings in appearance on the first roadway, (iii) a construction zone on the first roadway, (iv) a derailed train on the first roadway from the parallel railroad, (v) trains traversing on the railroad on the first roadway, and (vi) trains traveling towards a portion of the railroad that runs on the first roadway.

In some implementations, the method further includes: generating, by the plurality of sensors, the observational data based on the first sensor data and the second sensor data, wherein generating the observational data comprises: generates data indicative of the accident on the first roadway; generating, by the plurality of sensors, data indicative of the reduced lane markings in the appearance on the first roadway; generating, by the plurality of sensors, data indicative of the construction zone on the first roadway; generating, by the plurality of sensors, data indicative of the derailed train on the first roadway from the railroad; generating, by the plurality of sensors, data indicative of the trains traversing on the railroad on the first roadway; generating, by the plurality of sensors, data indicative of the trains traveling towards the portion of the railroad that runs on the first roadway; or generating, by the plurality of sensors, data indicative of an environment that comprises the first roadway and the second roadway.

In some implementations, the method further includes: determining, by the plurality of sensors, the instruction indicating whether to allow the detected autonomous vehicle to access the first roadway based on the generated observational data, wherein determining the instruction comprises: determining, by the plurality of sensors, a presence of one or more of the activities comprising (i) the accident on the first roadway, (ii) the reduced lane markings in appearance on the first roadway, (iii) the construction zone on the first roadway, (iv) the derailed train on the first roadway from the parallel railroad, (v) the trains traversing on the railroad on the first roadway, and (vi) the trains traveling towards a portion of the railroad that runs on the first roadway; in response to determining the presence of the one or more activities, determining, by the plurality of sensors, a first instruction to indicate the detected autonomous vehicle is not allowed to access the first roadway based on the generated observational data; or in response to determining an absence of the one or more activities, determining, by the plurality of sensors, a second instruction to indicate the detected autonomous vehicle is allowed to access the first roadway based on the generated observational data.

In some implementations, the method further includes: generating, by the plurality of sensors, third sensor data for the detected autonomous vehicle based on the detected autonomous vehicle on the first roadway and the data received at the system interface from the railroad system; generating, by the plurality of sensors, fourth sensor data based on one or more sensors of the plurality of sensors monitoring activities on the first roadway and the second roadway; generating, by the plurality of sensors, observational data based on the third sensor data and the fourth sensor data; determining, by the plurality of sensors, a second instruction indicating whether to allow the detected autonomous vehicle to exit the first roadway and access the second roadway based on the generated observational data; and transmitting, by the plurality of sensors, the second instruction to the detected autonomous vehicle while the detected vehicle traverses the first roadway.

The subject matter described in this specification can be implemented in various embodiments and may result in one or more of the following advantages. For example, by incorporating sensors that monitor both activity on the main roadway and the dedicated roadway, the sensors can help to ensure that vehicle and railroad traffic are not hindered. Similarly, these sensors can ensure that traffic from these vehicles and trains can move in a continuous and cooperative manner without disrupting one another on the dedicated roadway. Additionally, by ensuring the dedicated roadway can be shared, revenue can be generated for the railroad at a higher margin than what is typically charged for railway operation because both vehicles and trains can be charged for utilizing the railroad right of way, i.e., the dedicated roadway. Other features, aspects, and advantages of the subject matter will become apparent from the description, the drawings, and the claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
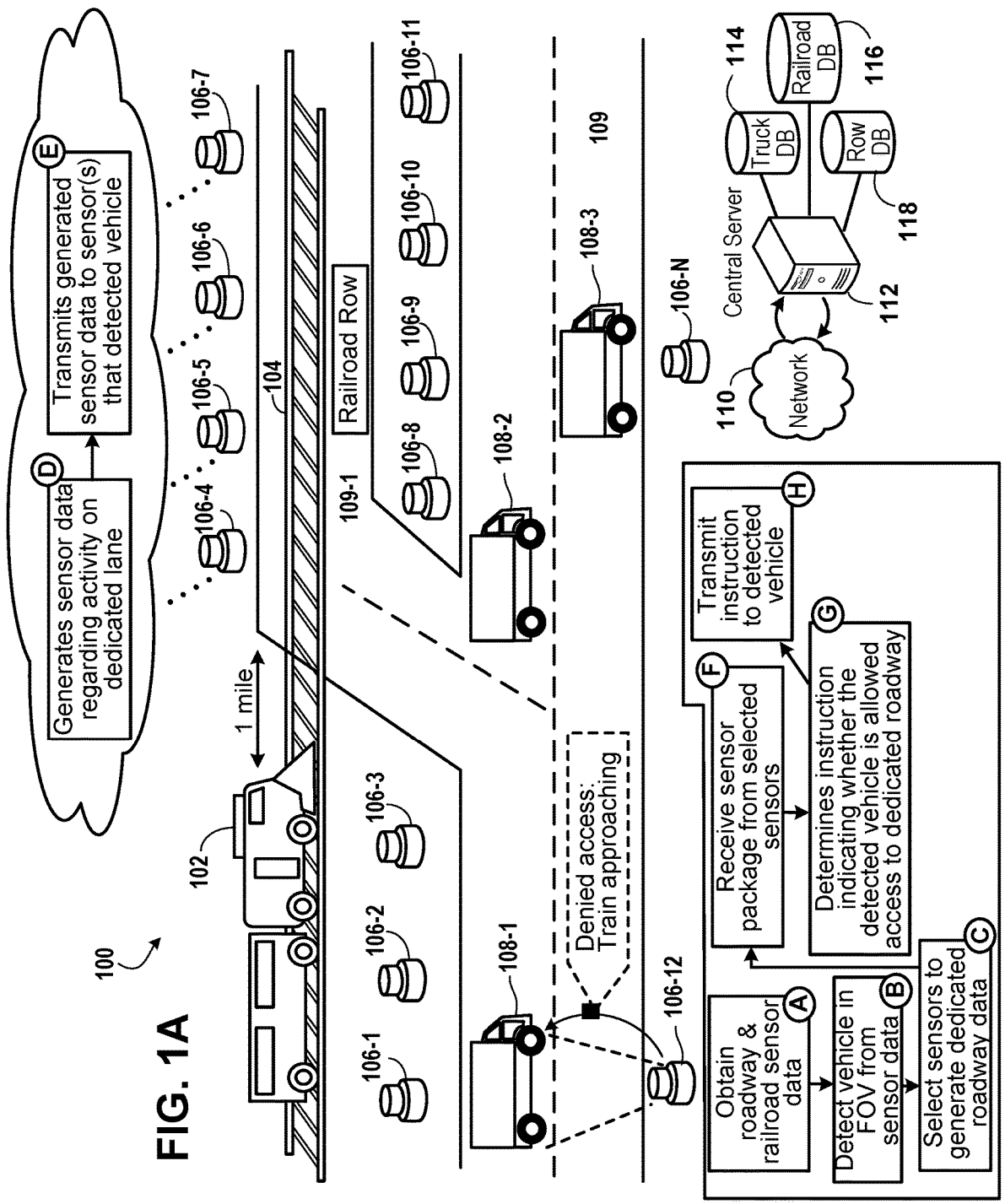
FIG. 1A is a block diagram that illustrates an example of a system for allowing autonomous vehicles access or egress for a dedicated roadway.

FIG. 1A is a block diagram that illustrates an example of a system 100 for allowing autonomous vehicles access or egress for a dedicated roadway. The system 100, deployed upon a roadway 109 on which autonomous vehicles 108-1 through 108-N (collectively "vehicles 108") travel, includes a plurality of sensors 106-1 through 106-N (collectively "sensors 106"), a network 110, a central server 112, a vehicle database 114, a railroad database 116, a railroad rights of way database 118, a train 102, and a railroad 104. In this example, the system 100 illustrates the processes performed by the sensors 106 and the central server 112. The system 100 illustrates three vehicles and thirteen sensors, but there may be more or less sensors and more or less vehicles, in other configurations. The roadway 109 is shown in system 100 with multiple lanes in a single direction. The roadway 109 may alternatively or additionally include more or less lanes having autonomous vehicles 108 travel in the same direction as well as more than one lane of vehicles traveling in opposing directions. FIG. 1A illustrates various operations in stages (A) through (H), which can be performed in the sequence indicated, in another sequence, with additional stages, or fewer stages.

In general, the system 100 can provide techniques for monitoring autonomous vehicles 108 on the roadway 109 and determining whether to allow the vehicles 108 access to a dedicated roadway 109-1 or to egress the dedicated roadway 109-1. In some examples, the roadway 109 can include a dedicated roadway 109-1. In some examples, the roadway 109 can allow the autonomous vehicles 108 to access the dedicated roadway 109-1 through one or more access points. The one or more access points can include the entirety of the dedicated roadway 109-1 and the roadway 109, as these two roadways may run next to one another in parallel. The autonomous vehicles 108 can switch between these two roadways by transitioning or switching between the two roadways at designated points along each roadway's traversal. In some examples, the one or more access points can include specific locations on the dedicated roadway 109-1 and the roadway 109 where the autonomous vehicles 108 can transition between the two roadways. For examples, these one or more access points can include roadway exits, entryway via charged tolls, left or right turns, some other type, or a combination of the above.

In some implementations, the dedicated roadway 109-1 can include one or more lanes that run in parallel to a railroad 104. In some implementations, the dedicated roadway 109-1 can include one or more lanes that run in place of or over top of the railroad 104. In some examples, the dedicated roadway 109-1 can be separate from the roadway 109 but the proximity of the roadways enable the vehicles to easily switch, e.g., access and egress, between the two roadways.

In some implementations, the system 100 can be used in a drayage environment. Specifically, in a drayage environment, trains and/or autonomous trucks can transport goods over short distances. For example, the goods can be transmitted from a ship that has entered at seaport to a warehouse, or from an inland port to a warehouse. The system 100 can utilize drayage in transferring shipments using various forms of transportation.

The system 100 enables monitoring autonomous vehicles 108 traversing the roadway 109 and the dedicated roadway 109-1. In some examples, the vehicles 108 can include autonomous vehicles or vehicles controlled by humans. The autonomous vehicles 108 can include and utilize one or more trained machine-learning models and an onboard sensor processing systems. Functionally, the one or more trained machine-learning models can execute in conjunction with the onboard sensor processing system to provide navigation and driving capabilities for each of the autonomous vehicles 108.

The autonomous vehicles 108 can obtain sensor data from its one or more sensors that communicate with an onboard sensor processing system and use the obtain sensor data to navigate the roadway 109. For example, the autonomous vehicles 108-1 can analyze the obtained sensor data by providing the obtained sensor data as input to its one or more trained machine-learning models. The one or more trained machine-learning models can output a likelihood detection of an event, a classification of one or more objects illustrated in the sensor data, and other likelihoods of detected events, e.g., 75% likelihood detection of a tree in the roadway. In response, the autonomous vehicle 108-1's route guidance system can analyze the output from the one or more trained machine-learning models to decide actions for the autonomous vehicle 108-1. These actions can include, for example, turn left, turn right, accelerate, decelerate, stop, reverse, and maintain current speed, to name some examples.

However, the on-board capabilities of the autonomous vehicles 108 can be impacted by external factors and may not function reliably. To improve the capabilities of the autonomous vehicles 108, the system 100 can deliver supplemental processing to the onboard capabilities of the autonomous vehicles 108 during their traversal of the dedicated roadway 109-1. More specifically, when the autonomous vehicles 108 traverse the dedicated roadway 109-1 of the roadway 109, the system 100 can provide the supplemental processing to the autonomous vehicles 108 to improve reliability and mitigating the operational burden of remotely monitoring and intervening in autonomous vehicle operations.

As will be further described in detail below, when autonomous vehicles 108 enter the dedicated roadway 109-1, the autonomous vehicles can receive instructions from sensors proximate to the dedicated roadway 109-1 to enhance its thinking. In this manner, the autonomous vehicles can switch to using an enhanced machine-learning model. The enhanced machine-learning model can rely on not only sensor data generated by sensors onboard the autonomous vehicle but can also rely on sensor data or instructions provided by the sensors proximate to the dedicated roadway 109-1. The sensors monitoring the dedicated roadway 109-1 can offer insight describing events and detection of actors that may be unseen by the onboard sensors of the autonomous vehicles. As such, the enhanced machine-learning model of the autonomous vehicle can have more visibility of the dedicated roadway 109-1 using sensor data from both onboard sensors and external sensors that monitor the dedicated roadway 109-1.

For example, the enhanced machine-learning model can receive inputs from the sensors that monitor the dedicated roadway 109-1. These inputs can include data indicating detected events on the dedicated roadway 109-1, actions for the autonomous vehicle to take while traversing the dedicated roadway 109-1 based on the detected events, and other sensor data as seen by the sensors monitoring the dedicated roadway 109-1. The enhanced machine-learning model can also receive sensor data as input from its own sensors onboard the autonomous vehicle and vehicle characteristics of the autonomous vehicle. In this case, the autonomous vehicles can effectively use both sets of sensor data for enriching the one or more trained machine-learning models while traversing the dedicated roadway 109-1 and utilize the actions produced by the enhanced machine-learning model to determine how to traverse the dedicated roadway 109-1.

The sensors 106 can include a variety of software and hardware devices that monitor objects on the roadway 109. For example, the sensors 106 can include a LIDAR system, a video camera, a RADAR system, a Cellular Vehicle-to-Everything (C-V2X) system, weather components, and a Wi-Fi system, to name a few examples. In some implementations, a sensor can include a combination of varying sensor types. For example, sensor 106-3 can include a video camera system, a RADAR system, and a C-V2X system; sensor 106-1 can include a video camera system and a LIDAR system; and, sensor 106-10 can include a Wi-Fi system, a camera system, and a C-V2X system. Other device combinations can be included within each of the sensors.

A sensor can detect and track objects on the roadway 109 and the dedicated roadway 109-1 through its field of view. For example, if sensor 106-2 includes a video camera, the field of view of the video camera can be based on the type of lens used, e.g., wide angle, normal view, and telephoto, for example, and the depth of the camera field, e.g., 20 meters, 30 meters, and 60 meters, for example. Other parameters for each sensor in system 100 can also be designated. For example, if the sensor 106-2 includes a LIDAR system, then the parameters required for its use would include a point density distribution, e.g., a distribution of the point cloud, a field of view, e.g., an angle the LIDAR system can view over, and a line overlap, e.g., a measure to be applied that affects ground coverage. Other parameters for each of the sensor devices are also possible.

The field of view of each sensors also becomes important because the system 100 can be designed in a variety of ways to enhance monitoring of stationary and moving objects on the roadway 109. For example, a designer may seek to overlap field of view of adjacent sensors 106 to ensure continuity for viewing the roadway 109 in its entirety. Overlapping fields of view regions may facilitate monitoring areas where objects enter the roadway 109 through vehicle on-ramps, exit the roadway 109 through vehicle off-ramps or intersections, or merge onto different lanes, such as merging onto the dedicated roadway 109-1. In some examples, the designer of system 100 may decide not to overlap the fields of view of adjacent sensors 106 but rather, juxtapose the fields of view of adjacent sensors 106 to ensure the widest coverage of the roadways 109 and 109-1. In this manner, the system 100 can monitor and track more vehicles on the roadways 109 and 109-1 at a time.

In addition, each sensor can include memory and processing components for monitoring the objects on the roadways 109 and 109-1. For example, each sensor can include memory for storing data that identified and tracks the objects in the order the vehicles appear to a sensor. Similarly, each of the sensors 106 can include processing components for processing sensor data, identifying the objects in the sensor data, generating the data that identifies the tracked objects, and is later used to actually track the identified objects. The processing components in each of the sensors 106 can include, for example, video processing components, sensor-processing components, transmission components, and receive components and/or corresponding capabilities. Each of the sensors 106 can communicate with one another over network 110. The network 110 may include a Wi-Fi network, a cellular network, a C-V2X network, an Ethernet network, or some other communicative medium.

The sensors 106 can also communicate with a central server 112 over network 110. The central server 112 can include one or more servers or computers connected locally or over a network. The central server 112 can also connect to one or more databases, e.g., a vehicle database 114, a railroad database 116, and a railroad right of way database 118. These databases can store data related to, for example, vehicles 108 traversing the dedicated roadway 109-1 and the roadway 109, trains 102 traversing the railroad 104, sensor data, and store data that represents the sensors 106 that are available to be used for monitoring the roadways 109 and 109-1. The stored data can indicate which sensors 106 are active, which of the sensors 106 are inactive, the type of data recorded by each of the sensors 106, components within each of the sensors 106, and data representing the fields of view of each of the sensors 106.

The central server 112 can store data identifying each of the sensors 106 such as, for example, IP addresses, MAC addresses, and preferred forms of communication to each particular sensor. The data can also indicate the relative positions of the sensors 106 in relation to each other. In this manner, a designer can access the data stored in the central server 112, or each of the databases 114 through 118, to learn which sensors 106 are being used to monitor which of the roadways 109 and 109-1, pertinent information for each of these sensors 106, and debugging information related to each of the sensors 106.

During stage (A), the sensors 106 deployed along the roadway 109 can generate sensor data that represents autonomous vehicles 108 traversing the roadway 109 or dedicated roadway 109-1. The sensors 106 can be deployed longitudinally along roadway 109, along one or both sides of the roadway 109, spaced a predetermined distance apart from another, and positioned so that its field of view faces the roadway 109. Similarly, the sensors 106 can be deployed on the dedicated roadway 109-1 for monitoring autonomous vehicles 108 in a similar manner. Moreover, the sensors 106 can be configured to generate sensor data of road actors, e.g., objects in each of the roadways, autonomous vehicles 108 on the roadways, people walking in parallel to and perpendicular to the roadways, animals on each of the roadways, and other objects.

The sensors can obtain sensor data from areas of the roadway 109 (including dedicated roadway 109-1) and sensor data from the railroad 104. For example, the sensor data can include input video data, audio data, images, LIDAR data, RADAR data, and other data types. The data can include recordings of sensors data from different locations on the roadway 109 as seen by the fields of view of each of the sensors 106, and can also include sensor data from different portions of the railroad 104.

In some implementations, the sensors 106 monitoring the roadway 109 can also monitor the railroad 104 and its corresponding activities. Specifically, the sensors 106 may include omni-directional capabilities that enable these sensors to obtain sensor data from each direction simultaneously, in a 360-degree fashion. In this manner, the sensors 106 can not only monitor autonomous vehicles traversing the roadway 109, but also one or more trains, e.g., train 102 traversing the railroad 104, in the event the railroad 104 runs in parallel to the dedicated roadway 109-1. In the situation where the railroad 104 runs in parallel to the dedicated roadway 109-1, should an autonomous vehicle 108 cross onto the railroad 104, then the sensors 106 can notify the railroad system and the central server 112 of the vehicle on the railroad 104. Similarly, should the train 102 fall off the railroad 104 onto the dedicated roadway 109-1, then the sensors 106 can notify the central server 112 and the autonomous vehicles 108 traversing the roadway 109 of actions to take to avoid the fallen train 102.

The roadway 109 and the dedicated roadway 109-1 can include various types of roads. For example, the types of roads can include exit ramps, entry ramps, general-purpose lanes, high occupancy vehicle (HOV) lanes, highways, back roads, side streets, median crossings, at-grade crossings, and other roads. The other roads can include different types of various capacity roads, larger roads, private roads, intersection roads, and other thoroughfares that sensors 106 displaced along these roadways can generate sensor data.

During stage (B), the sensors 106 can detect one or more road actors from the sensor data and the observational data in their field of view. The sensors 106 positioned along these roadways can generate sensor data as they detected road actors entering their field of view on the roadways. For example, the sensor data generated by each of the sensors 106 can include an identification of a vehicle type, identification of an object type, characteristics of detected vehicles, vehicular congestion, vehicle dynamics, vehicle density per unit area, vehicle travel path, to name some examples.

The identification of the vehicle type can correspond to, for example, a truck, a sedan, a minivan, a hatchback, an SUV, and other vehicle types. The identification of the vehicle type can be based on a size of the vehicle, for example. Characteristics of the vehicle can include, for example, vehicle color, vehicle size, wheelbase distance, length of vehicle, height of vehicle, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

The observational data can include an environment in which these vehicles, objects, people are found, and how these items are current interacting with the environment. For example, the observational data can include a location of the environment which surrounds the traveling vehicles, e.g., hilly terrain, farmland, next to the beach by the sea, and other examples. Moreover, the observational data can include a location of one or more access points between the roadway 109 and the dedicated roadway 109-1 and a distance between the dedicated roadway 109-1 and the roadway 109. The observational data can also describe, for example, a velocity of other vehicles traversing the roadway 109 and the dedicated roadway 109-1, a movement direction of each of the other vehicles on the roadway, and one or more objects on the roadway 109 or the railroad 104 that may hinder traffic or railroad traffic movement.

In some implementations, the sensors 106 deployed at each of these roadways can generate the sensor data at various intervals. Each time a sensor detects a vehicle in its field of view, the sensor can generate the sensor data. For example, in response to generating the sensor data, the sensor 106-12 can transmit the generated sensor data to the next sensor in the longitudinal direction along the same roadway 109 to confirm that it also detects similar sensor data, e.g., to sensor 106-N. The next sensor can pass its generated sensor data to the next sensor down the longitudinal line on the roadway 109 to ensure it sees similar vehicles, and so on. In this manner, the generated sensor data is highly accurate because each sensor on the roadway 109 can confirm the prior sensor's generated sensor data. In some examples, the sensors 106 can generate sensor data on a time basis, such as every 3 seconds. On the time basis, the sensors 106 may reduce their bandwidth and processing, but may also be less accurate in terms of identification and detection.

For example, sensor 106-1 can detect that autonomous vehicle 108-1 has entered its field of view. In response to detecting, the sensor 106-1 can record sensor data or media of a segment or portion of the roadway 109 and process the recorded sensor data using object detection or some other form of classification to detect the moving object. The object detection can seek to identify a vehicle, a person, and animal, or an object on the roadway 109. The object may be stationary or may be moving. In the example of system 100, the sensor 106-1 can detect and classify the autonomous vehicle 108-1 on the roadway 109. Similarly, the sensors 106-1 through 106-3, 106-8, and 106-12 will have processed autonomous vehicle 108-3.

In some implementations, each of the sensors 106 can detect autonomous vehicle 108-1 by performing data aggregations of observations over a window of time. The data aggregations can improve the sensors' detectability of a vehicle in its field of view. The data aggregation can ensure that each sensor can identify and detect similar vehicles and their corresponding features.

The sensor 106-1 can then identify one or more features of the autonomous vehicle 108-1 detected in its field of view. These features can include observable properties of the vehicle, such as the vehicle color, e.g., as represented by red-green-blue (RGB) characteristics, the vehicle size, the vehicle class, and the volume of the vehicle, each of these calculated through optical characteristics. For example, the sensor 106-1 can determine that autonomous vehicle 108-1 is a black colored vehicle, is over 200 ft$^3$ in size, has a vehicle type of a semi-truck, and is a large sized vehicle. The sensor 106-1 may also determine one or more characteristics of the vehicle. The one or more characteristics of the vehicle can include, for examples, its velocity, its rate of speed or acceleration, its distance away from the sensor 106-1, the autonomous vehicle 108-1's direction of travel, a prior path taken by the autonomous vehicle as gleaned through data received by sensor 106-1 from prior sensors, and a number of individuals found in the autonomous vehicle 108-1, to name some examples.

In some implementations, the types of components found at the particular sensor that detect the autonomous vehicle can determine the characteristics that describe the vehicle. For example, the sensor 106-1 may include a LIDAR system, a camera system, and a Wi-Fi system. The sensor 106-1 can then determine characteristics using the media recorded from the video camera and the point cloud recorded by the LIDAR system. For example, the sensor 106-1 can determine a color of the object, a size of the object, a distance from the object, a rate of movement of the object, and a direction of movement of the object. However, if the sensor 106-1 does not include a LIDAR system, the sensor 106-1 can rely on other components to determine the distance from the object, rate of movement of the object, and a direction of the object, to name some examples. For example, the sensor 106-1 may be able to utilize an external classifier to produce these results. The external classifier may be stored at the sensor 106-1 (and each of the sensors) or stored at a location accessible to the sensor 106-1 over network 110, e.g., such as at the central server 112. Thus, the system 100 can benefit from having a combination of components to improve the detection process found at each of the sensors.

In some implementations, the sensor 106-1 can generate other feature data on the sensor data using sensor fusion. For example, in the case where sensor 106-1 utilizes multiple components, e.g., LIDAR system, RADAR system, and a video camera system, the sensor 106-1 can combine the observation from each of these components and assign these observations to a point in space. The point in space can represent an N-dimensional value that describes the feature. Then, the sensor 106-1 can use features to calculate and classify that particular point in space. For example, the sensor 106-3 can enjoin data from the RADAR system, the LIDAR system, and the camera system. The LIDAR system can generate a 1 point per centimeter for 200 meter-range for viewing the roadway 109, for example. The RADAR system can perform calculations that estimate where the vehicle or object is located in relation to the RADAR system. The video camera can estimate a volumetric projection of the identified object or vehicle based on a volumetric projection estimation algorithm. The sensor 106-1 can then calculate an identity product, e.g., the feature data, using the observations from each of these sensors, which can correspond to a hash of the observations. For example, the sensor 106-1 can calculate an identity product of the feature data and a timestamp the features were identified, from data provided by each of the sensors.

Then, the sensor 106-1 can transmit data representing the identity product of the feature data to the next sensor in the direction of traffic, e.g., sensor 106-2. The sensor 106-1 may transmit the data representing the identity product of the feature data when autonomous vehicle 108-1 has exited sensor 106-1's field of view. The data representing the identity product of the feature data include, for example, a data structure, a matrix, or a link to data stored in an external database. The sensor 106-1 can determine which sensor is the next sensor in a longitudinal line along the roadway 109. In some implementations, the sensor 106-1 may determine the next sensor by checking an order of the sensors. In some implementations, the sensor 106-1 may request from the central server 112 to indicate which sensor is the next sensor to receive the data. In response to receiving an indication from the central server 112 indicating which sensor is next to receive the data, e.g., sensor 106-2, the sensor 106-1 can transmit the data representing the identity product of the feature data to sensor 106-2 over network 110.

The sensor 106-2 can receive the identity product of the feature data from the sensor 106-1. The sensor 106-2 can generate feature data when it detects autonomous vehicle 108-1 in its field of view. In response to generating the feature data, the sensor 106-2 can compare the generated feature data with the received feature data from sensor 106-1. If the comparison results in a match or a near match within a threshold value, then the sensor 106-2 can determine that it is viewing the same autonomous vehicle 108-1 as seen by the sensor 106-1. In some examples, sensor 106-2 may transmit a confirmation back to sensor 106-1 indicating that it saw the same vehicle. Then, when autonomous vehicle 108-1 exits the field of view of sensor 106-2, the sensor 106-2 can transmit the generated feature data to the next sensor down the roadway 109, e.g., sensor 106-3. Each sensor within system 100, e.g., sensors 106-1 through 106-N, can perform a similar process when a vehicle is detected in its field of view.

In some implementations, the sensor can transmit their respective sensor data to the central server 112 each time a new object is detected. In some examples, the sensors 106 can transmit their respective sensor data when a sensor receives confirmation from the next sensor down the longitudinal line of sensors. The generated sensor data cannot only include data regarding detected objects, but data identifying the sensors. The data identifying the sensors can include, for example, a type of sensor, the data generated by the sensor, IP addresses of the sensor, MAC addresses of the sensor, and other information to name some examples.

The central server 112 can receive the sensor data from each of the sensors 106. In some examples, the central server 112 can access one or more databases to retrieve the generated sensor data from each of the sensors. In response, the central server 112 can generate vehicular characteristics of a detected vehicle from the generated sensor data. The vehicular characteristics can include, for example, prevailing speeds of the vehicles, vehicle dynamics, sensor visibility, object identification, and train characteristics.

For example, the prevailing speeds of the vehicles along the roadway 109 can correspond to the speed at which 85 percent of the vehicles are traveling at or below that speed. The central server 112 can use the calculated prevailing speed as a reference for the speeds at which the autonomous vehicles 108 should travel along the roadway 109. The central server 112 can determine vehicle dynamics of autonomous vehicles 108 currently traversing the roadway 109. The vehicle dynamics can include vehicle acceleration, vehicle speed, and vehicle deceleration. Moreover, the central server 112 can determine sensor visibility, and determine whether the sensors can accurately see the road actors on the roadway 109. The central server 112 can determine from the sensor visibility whether a sensor is too close to another sensor, as the sensors share overlapping fields of view, and whether the sensors are too close or too far from the roadway 109. In response to generating this information, the central server 112 can aid the sensors 106 monitoring the roadway 109 in determining whether the vehicles 108 can access the dedicated roadway 109-1. Moreover, the central server 112 can aid the sensors monitoring the dedicated roadway 109-1 in determining actions for the autonomous vehicles 108 to take. For example, based on current detected speeds of vehicles and identification of trains in the sensors data, the central server 112 can instruct the sensors to instruct the autonomous vehicles traversing the dedicated roadway 109-1 to take a specific action, e.g., slow down, accelerate, or stop, to name a few examples.

Similarly, each autonomous vehicle 108 may include one or more sensors, an onboard processing sensor system, and one or more trained machine-learning models. As autonomous vehicle 108-1 traverses the roadway 109, the sensors of autonomous vehicle 108-1 can obtain sensor data in a continuous fashion. The sensor data can include, for example, video, audio, LIDAR data, radar data, and other data types. The sensor data can illustrate an environment proximate to the autonomous vehicle 108-1 as seen by its sensors. The environment can include, for example, a portion of the roadway 109, traffic signs, traffic lights, merge lanes, transition lanes, exit lanes, continuous lanes, objects in the roadway 109, the railroad 104, train 102, and other data. The sensors of autonomous vehicle 108-1 (and the other autonomous vehicles) can obtain sensor data in a continuous or periodic fashion, to name a few examples.

In some implementations, the onboard sensor system can obtain current vehicle characteristics. Specifically, the onboard sensor system can communicate with various devices in the autonomous vehicle 108-1's using the controller area network (CANBUS) system. The CANBUS system can provide a means for the onboard sensor system to obtain information related to the autonomous vehicle 108-1's characteristics. These characteristics can include, for example, data related to autonomous driving, advance driver assistance system (ADAS), transmission, airbags, antilock braking (ABS), cruise control, electric power steering, audio systems, power windows, doors, mirror adjustment, battery and recharging systems, and vehicle dynamics, e.g., vehicle speed. For example, the onboard sensor system can communicate with the engine control unit (ECU) using the CANBUS system to obtain vehicle characteristic information.

For example, the onboard sensor system can provide the sensor data and the vehicle characteristics as input to the one or more trained machine-learning models. The one or more trained machine-learning models can receive as input video, audio, images, LIDAR data, radar information, current vehicle characteristics information, and other data types. These data types can be in the form of image files, binary files, and other file types. The one or more trained machine-learning models can process the received inputs through each of the nodes in the models. The one or more trained machine-learning models can receive inputs and generate outputs on a continuous basis or each time the sensors obtain new input data.

In some implementations, the one or more trained machine-learning models can output a likelihood detection of an event, a classification of one or more objects illustrated in the sensor data, and other detected events in response to processing the inputs. For example, as illustrated in system 100, the one or more trained machine-learning models can output a detection of 99% of an obstacle free zone on roadway 109. This output can indicate to the route guidance system of the autonomous vehicle 108-1 that the portion of roadway 109 as seen by onboard sensors does not detect an obstacle, an object, or other blocking device on roadway 109 with 99% confidence.

The one or more trained machine-learning models can also output other detection types and confidence levels. For example, the one or more trained machine-learning models can output a 70% detection of a deer on roadway 109, a 90% detection of a train on roadway 109, e.g., indicative of train 102 that has fallen off the railroad 104 and onto the roadway 109, a 30% detection of rainy or ice on roadway 109, and other detection types. The one or more trained machine-learning models can output a likelihood of an event and a description of an event depicted in the input. In response to generating the output, the onboard sensor processing system can provide the output to a route guidance system of the autonomous vehicle 108-1.

The route guidance system of the autonomous vehicle 108-1 can receive the output from the one or more trained machine-learning models. The route guidance system can include one or more algorithmic processes that can monitor a location of a vehicle in real time, e.g., via geographic coordinate system (GPS), and map the location of the vehicle on a digital map. For an autonomous vehicle, the route guidance system can ensure the autonomous vehicle 108-1 follows a route guidance from an origin location to a destination location.

The route guidance system can identify a path for the autonomous vehicle 108-1 to travel from an origin location to a destination and ensure the autonomous vehicle 108-1 reaches the destination safely. Specifically, the route guidance system can produce actions for the vehicle to take while traversing to the destination. These actions can include, for example, accelerate, change lanes, stop, decelerate, turn left, turn right, U-turn, and other actions. The route guidance system can rely on outputs from the one or more trained machine-learning model to produce actions for the autonomous vehicle to take while traversing to the destination. For example, if the route guidance system determines that the one or more trained machine-learning models determines a 99% likelihood of obstacle free zone, then the route guidance system can determine that the autonomous vehicle 108-1 continues on its guided path to the destination.

Alternatively, if the one or more trained machine-learning models determine a 99% likelihood of an identified obstacle on the roadway 109, and then the route guidance system can determine an action for the autonomous vehicle 108-1 to avoid the obstacle. These actions to avoid the obstacle can include, for example, stopping until the obstacle has cleared, slowing down to let the obstacle pass off the roadway 109, changing lanes to avoid the obstacle, and other actions. The route guidance system can continuously output actions for the autonomous vehicle 108-1 to take based on a monitoring of the route guidance path and the output provided by the one or more trained machine-learning models.

In some implementations, an external party may set a route guidance path for the autonomous vehicle 108-1 to travel. The external party, which may include a human or a computer system, may set the route guidance path for the autonomous vehicle 108-1 to travel before the autonomous vehicle 108-1 departs for the destination. Similarly, the autonomous vehicle 108-1 may receive a route guidance path while in transit to a destination and may receive updates to the route guidance path while in transit to the destination. In some examples, the route guidance path can include, for example, a GPS location of a destination, a path for the route guidance system to follow from an origin to a destination, a name of a destination, and other data specifying the origin location, the destination, and the path for the route guidance system to follow.

In some examples, the route guidance system of the autonomous vehicle 108-1 can produce an action to take. The action can include "Turn Left," for example. In response to producing an action, the route guidance system can instruct the autonomous vehicle 108-1 to move in accordance with the action. For example, if the route guidance system instructs the autonomous vehicle 108-1 to turn left, then the route guidance system can instruct various components of the vehicle, e.g., steering wheel, axel, tires, accelerator, brake, etc., to collectively move the autonomous vehicle 108-1 to make a left turn. Similarly, the route guidance system can instruct the autonomous vehicle 108-1 to take other actions as well.

In some implementations, the route guidance system of the autonomous vehicle 108-1 can receive an instruction from an external party to instruct the autonomous vehicle 108-1 to enter the dedicated roadway 109-1. In some implementations, the route guidance system of the autonomous vehicle 108-1 can automatically generate an instruction that instructs the autonomous vehicle 108-1 to enter the dedicated roadway 109-1. These instructions can come from a prior route guidance party or during the autonomous vehicle 108-1's current traversal on roadway 109.

In some implementations, the sensors 106 can monitor the path of traversal of the autonomous vehicle on the roadway 109. For example, as the autonomous vehicle 108-2 enters and subsequently exits the fields of view of sensors 106-1, 106-2, and 106-3, these specific sensors can identify the autonomous vehicle 108-2 and detect its movement. However, after sensor 106-3 detects the autonomous vehicle 108-2 entering and exiting its field of view, the sensor 106-3 can transmit its identity product of feature data to both sensors 106-4 and sensor 106-8. The sensors can transmit the identity product of feature data to multiple sensors when the roadway 109 splits in different directions. By transmitting the identity product of feature data to multiple sensors, e.g., sensor 106-4 and sensor 106-8, the sensors 106 can continuously monitor the path of autonomous vehicle 108-2's movement when the roadway 109 travels in different directions. Similar actions can be performed for each detected vehicle.

For example, if the sensor 106-8 determines a vehicle entered its field of view and determines that the identity product of feature data received from sensor 106-3 matches to the feature data generated by sensor 106-8, then sensor 106-8 can determine that autonomous vehicle 108-2 is the same vehicle seen by sensor 106-3, and that the autonomous vehicle 108-2 is traversing down roadway 109. Alternatively, if the sensor 106-4 determines a vehicle entered its field of view and determines that the identity product of feature data received from sensor 106-3 matches to the feature data generated by sensor 106-4, then sensor 106-4 can determine that autonomous vehicle 108-2 is the same vehicle seen by sensor 106-3, and that the autonomous vehicle 108-2 has turned into the dedicated roadway 109-1 from the roadway 109. As illustrated in system 100, autonomous vehicle 108-2 has maintain course on the roadway 109.

During stage (C), the sensors can analyze the dynamics of the detected vehicle and sensor data to determine whether the detected vehicle can access or not access the dedicated roadway 109-1. Moreover, in order to determine whether to grant access for the detected vehicle to transition to the dedicated roadway 109-1, the sensors can select one or more sensors monitoring the dedicated roadway 109-1 to identify whether activity exists on the dedicated roadway 109-1. For example, as illustrated in system 100, the sensor 106-12 can obtain sensor data as described during stage (A) and detect vehicle 108-1 in the obtained sensor data as described during stage (B). In response, sensor 106-12 can select one or more sensors monitoring the dedicated roadway 109-1 to identify through those sensors whether any activity exists on the dedicated roadway 109-1. In this manner, the sensor 106-12 can determine whether to allow or deny the autonomous vehicle 108-1's access to the dedicated roadway 109-1 based on the identified activity from the selected sensors monitoring the dedicated roadway 109-1.

In some implementations, the sensor 106-12 may not be able to view activity on the dedicated roadway 109-1 from its current position. For example, as illustrated in system 100, sensor 106-12 monitors a portion of the roadway 109 through its field of view, and its field of view may or may not include a portion of the dedicated roadway 109-1. In order for the sensor 106-12 to be able to provide instructions to the detected autonomous vehicle 108-1 as to whether it can access the dedicated roadway 109-1 in a safe manner, the sensor 106-12 can obtain information as to whether the activity on the dedicated roadway 109-1 may impede vehicular or train traffic. As such, the sensor 106-12 can request for sensor data and/or data from one or more specific sensors monitoring the dedicated roadway 109-1 that illustrates one or more activities occurring. If the sensor 106-12 obtains sensors and/or activity data that illustrates one or more activities occurring that can cause disruption to vehicle or railroad traffic along the dedicated roadway 109-1, then the sensor 106-12 may deny the detected autonomous vehicle 108-1's access to the dedicated roadway 109-1. Alternatively, if the activity does not cause disruption to vehicle or railroad traffic along the dedicated roadway 109-1 or no activity exists, then the sensor 106-12 can allow the detected vehicle 108-1's access to the dedicated roadway 109-1.

In some implementations, the sensor 106-12 can select the one or more sensors monitoring the dedicated roadway 109-1 based on a current position of the detected autonomous vehicle 108-1. For example, the sensor 106-12 can identify a current location of the detected autonomous vehicle 108-1. The current location of the detected autonomous vehicle 108-1 can be recorded in geographical locational coordinates such as, for example, 34.012265 and −118.492837. In response to identifying the current location of the detected autonomous vehicle 108-1, the sensor 106-12 can select one or more sensors monitoring the dedicated roadway 109-1 based on their position being located after the geographical location of the detected autonomous vehicle 108-1. Further, these sensors are selected based on their location on the dedicated roadway 109-1 being after the geographical location of the detected autonomous vehicle 108-1 and along a direction of travel on the roadway 109 and the dedicated roadway 109-1. Specifically, the sensor 106-12 can identify sensors who can obtain activity data from sensors who are located at a position after or ahead of the geographical position of the detected vehicle. For example, the sensor 106-12 can identify sensors 106-4, 106-5, 106-6, and 106-7, since their geographical locations follow a location of the detected autonomous vehicle 108-1 along the direction of travel of the roadways 109 and 109-1.

For example, sensor 106-4 can include a geographical location of 35.012265 and −117.2, sensor 106-5 can include a geographical location of 36.012265 and −117.2, sensor 106-6 can include a geographical location of 37.012265 and −117.2, and sensor 106-7 can include a geographical location of 38.012265 and −117.2. In this example, the sensor 106-12 can select sensors whose latitude is greater than the current latitude of the geographical location of the detected vehicle, e.g., 34.012265 and −118.492837. This example holds true assuming the direction of travel of the dedicated roadway 109-1 directly correlates with an increase in latitude. Generally, the sensor 106-12 can select one or more sensors whose longitude and/or latitude is adjusted in magnitude based on a direction of travel along the dedicated roadway 109-1. For example, if the current location of the detected autonomous vehicle 108-1 is 34.012265 and −118.492837, and the direction of travel along the dedicated roadway 109-1 corresponds with an increase in latitude and longitude from a current location of the detected autonomous vehicle 108-1, then the sensor 106-12 can select various sensors that monitor the dedicated roadway 109-1 whose locations are also greater in both latitude and longitude than the current location of the detected autonomous vehicle 108-1. In some examples, if the direction of travel along the dedicated roadway 109-1 corresponds with in an increase in longitude from a current location of the detected autonomous vehicle 108-1 while the latitude remains constant, then the sensor 106-12 can select various sensors that monitor the dedicated roadway 109-1 whose location are greater in longitude from the current location of the detected autonomous vehicle 108-1. Other examples are also possible.

In some implementations, the sensor 106-12 can select these specific sensors monitoring the dedicated roadway 109-1 to identify activities that may impact the detected autonomous vehicle 108-1's further travel path on the dedicated roadway 109-1. Specifically, the sensor 106-12 can select sensors 106-4 through 106-7 (collectively "requested capture sensors") because their field of view provides an insight into activity the detected autonomous vehicle 108-1 will traverse through should sensor 106-12 allow autonomous vehicle 108-1 access to traverse the dedicated roadway 109-1. For example, as illustrated in system 100, the requested capture sensors are located after the current location of the detected autonomous vehicle 108-1 along the direction of travel on the dedicated roadway 109-1. The activities recorded by the requested capture sensors can be provided to the sensor 106-12 to make a determination as to whether the autonomous vehicle 108-1 can access the dedicated roadway 109-1 without causing disruption to traffic or railway traffic on the dedicated roadway 109-1.

In some implementations, a sensor who detects a vehicle on roadway 109 does not select one or more sensors monitoring the dedicated roadway 109-1 whose positions are located behind the current location of the detected autonomous vehicle. For example, sensor 106-N can detect autonomous vehicle 108-3 traversing the roadway 109. In response, the sensor 106-N can select sensors 106-6, 106-7, and 106-13 through 106-17 to provide activity occurring on the dedicated roadway 109-1. Sensor 106-N may not select sensors 106-4 through 106-5 because these sensors location along the direction of travel of the dedicated roadway 109-1 are behind the current location of the detected autonomous vehicle 108-3.

In this implementation, the sensor 106-N only seeks to identify activity that the detected autonomous vehicle 108-3 may collide with or traverse through upon potentially switching from the roadway 109 into the dedicated roadway 109-1. For example, when the detected autonomous vehicle 108-3 switches to the dedicated roadway 109-1 from its current location, the autonomous vehicle 108-3 can drive from its current location on the roadway 109 to the dedicated roadway 109-1, where the autonomous vehicle 108-3 passes through fields of view of sensors 106-6, 106-7, and 106-13 through 106-17. Moreover, the autonomous vehicle 108-3 does not pass through fields of sensors 106-4 through 106-5 when transitioning from the roadway 109 to the dedicated roadway 109-1, and thus, the sensor 106-N may not request the activity data from sensors 106-4 through 106-5.

In some implementations, a sensor who detected a vehicle may select sensors whose position comes before the current location of the detected autonomous vehicle along the direction of traffic of the dedicated roadway 109-1. Continuing with the example from above of sensor 106-N detecting autonomous vehicle 108-3, the sensor 106-N can identify sensors 106-6, 106-7, and 106-13 through 106-17 to provide activity occurring on the dedicated roadway 109-1. In addition to selecting these sensors, the sensor 106-N may also select sensors 106-4 and 106-5 to identify their activity data despite the location of sensors 106-4 and 106-5 being behind the current location of the autonomous vehicle 108-3.

For example, there may be activity that occurs behind a current geographic location of the autonomous vehicle 108-3 on the dedicated roadway 109-1 which may aid the sensor 106-N in determining whether to allow vehicle 108-3 access to the dedicated roadway 109-1. Specifically, train 102 may be traversing the railroad 104 and only sensor 106-4 can currently detect the train 102 in its field of view. By retrieving sensor data from the sensors 106-4 and 106-5, the sensor 106-N can ensure the autonomous vehicle 108-3 is not allowed access to the dedicated roadway 109-1 if a train 102 is traveling down the railroad 104 which overlaps with the dedicated roadway 109-1. In some examples, these sensors, e.g., sensors 106-4 and 106-5, may detect other activity that may impact the autonomous vehicle 108-3 traversal on the dedicated roadway 109-1. This activity can include, for example, traffic jam, erratic driving behavior, and a closure on the dedicated roadway 109-1, to name some examples.

In some implementations, the sensor 106-12 may transmit a request to the central server 112 over network 110 for data identifying addresses for sensors whose location follows a current location of the detected vehicle. Specifically, the sensor 106-12 may generate a request that includes a current location of the detected vehicle, e.g., coordinates of detected vehicle 108-1, and a request for data that identifies addresses for each of the sensors that monitors the dedicated roadway 109-1 and whose location follows the current location of the detected vehicle along the direction of travel on the dedicated roadway 109-1. In some examples, the sensor 106-12 may generate the request that includes the current location of the detected vehicle and a request for data that identifies addresses for each of the sensors that monitors the dedicated roadway 109-1.

In response, the central server 112 can provide data that identifies the addresses of each of the requested sensors that monitor the dedicated roadway 109-1 to the requesting sensor, e.g., sensor 106-12. The data that identifies the addresses for each of the requested sensors can include, for example, an IP address, a MAC address, an email address, or another communication address. The sensor 106-12 can use the data that identifies the addresses of each of the requested sensors to transmit a request for sensor and/or activity data from each of these corresponding sensors. For example, as illustrated in system 100, the sensor 106-12 can request for data identifying addresses for each of the sensors 106-4 through 106-7 from the central server 112.

In some examples, each of the sensors 106 can include in their memory data identifying the other sensors in system 100. The data identifying the other sensors can include, for example, a geographical location of the sensor, e.g., latitude and longitude coordinates, data identifying an address for the sensor, data indicating whether the sensor monitors the dedicated roadway 109-1, the roadway 109, or both, and data identifying one or more components within a sensor. In this example, the sensor 106-12 can access its memory to identify addresses for each of the requested capture sensors.

In response to identifying addresses for each of the requested capture sensors either from the central server 112 or from its memory, the sensor 106-12 can generate a request for sensor data and activity data. The request can include, for example, data identifying the sensor that generated the request, e.g., sensor 106-12, and a request for sensor data and activity data for a predetermined period of time. The predetermined period of time may include an amount of time for capturing sensor data such as, for example, 0.5 seconds, 1 second, 2 seconds, 3 seconds, or another period of time.

In some implementations, the sensor 106-12 can select the predetermined period of time as an amount of capture time of sensor data and activity data for a particular sensor. A tradeoff exists for selecting a predetermined period of time. If the sensor 106-12 selects a high predetermined period of time, such as 3 seconds, then the sensor 106-12 may lose detected vehicle 108-1 in its field of view prior to receiving the sensor data and activity data from the requested capture sensors. On the other hand, if the sensor 106-12 selects a low predetermined period of time, such as 0.001 seconds, then the sensor 106-12 may receive inaccurate sensor data and activity data from the requested capture sensors, as they may not capture a sufficient amount of sensor data to accurate define the activity occurring in their field of view on the dedicated roadway 109-1. As such, the sensor 106-12 can select the predetermined period of time that minimizes the recording by the requested capture sensors, e.g., sensors 106-4 through 106-7, in order to identify accurate activity while ensuring the detected vehicle 108-1 is still within the sensor 106-12's field of view.

For example, the sensor 106-12 can select the predetermined period of time for the requested sensors using various characteristics. These characteristics can include, for example, a field of depth of sensor 106-12, a field of width of sensor 106-12, the speed limit of the roadway 109, amount of time required to transmit the request from sensor 106-12 to the requested capture sensors and the amount of time to receive the sensor data response from the requesting sensors. The sensor 106-12 can calculate a predetermined of time with the various characteristics by averaging, summing, identifying the median, or performing some other statistical calculation on the various characteristics. In some examples, the sensor 106-12 may request for a predetermined period of time that is sufficient for data capture from the central server 112. The central server 112 can review historical data to identify a predetermined period of time that is sufficient for data capture in response to receiving the request from the sensor 106-12. Specifically, the central server 112 can analyze historical data that includes prior predetermined periods of time and prior sets of the various characteristics to identify a predetermined period of time that matches the current characteristics of system 100. In response, the central server 112 can provide the identified predetermined period of time to the requesting sensor 106-12.

The sensor 106-12 can transmit the generated request to each of the requested sensors. In some examples, the sensor 106-12 can transmit the generated request to the requested capture sensors over the network 110. In some examples, the sensor 106-12 can transmit the generated request to the requested capture sensors through a shortest path of the other sensors, based on their respective distance between one another. For example, the shortest path between sensor 106-12 to the requested capture sensors is from sensor 106-12 to sensor 106-1, to sensor 106-2, to sensor 106-3, and finally arriving at sensors 106-4 through 106-7. By transferring the generated request to the requested capture sensors via the shortest path, the system 100 can conserve network bandwidth by reducing the amount of requests being sent. Specifically, instead of sending four separate requests, one to each of sensors 106-4 through 106-7, the sensor 106-12 can send one request that is propagated through the shortest path of sensors and ultimately reaches the destination of the requested sensors.

Similarly, as will be further described below, the sensor 106-12 can transmit a request to an interface system that monitors the activities of the train 102 and the railroad 104. The request can include all information relevant to train 102 and railroad 104 activities. This can include, for example, a predicted time when the train 102 is to reach a destination, e.g., a location proximate to one or more at-grade crossings or to an end destination, a current location of train 102, a direction of travel of train 102, a current speed of train 102, and additional status information related to train 102.

During stage (D), the requested capture sensors can receive the request transmitted by the sensor 106-12. In response to receiving the request transmitted by the sensor 106-12, these requested capture sensors, e.g., sensors 106-4 through 106-7, can extract the data from the received request. These sensors can extract data from the request to determine which sensor transmitted the request and for how long these sensors are required to capture sensor and activity data. For example, these sensors can determine that sensor 106-12 transmitted the request and the predetermined period time of capture is 0.5 seconds.

In response to extracting data from the request, the sensors 106-4 through 106-7 can capture sensor and observational data in their field of view for the extracted predetermined period of time. The sensors 106-4 through 106-7 can capture sensors and observational data in a similar manner to that performed during stage (A). For example, based on the components within each of the sensors 106-4 through 106-7, these sensors can capture sensor data that includes video data, audio data, one or more images, LIDAR data, RADAR data, and other data types.

This recorded data can include environments seen by the sensors 106-4 through 106-7. These environments can include, for example, portions of the dedicated roadway 109-1, portions of the railroad 104 that overlaps the dedicated roadway 109-1, and portions of the railroad 104 when the railroad 104 does not overlap the dedicated roadway 109-1 but runs in parallel to the dedicated roadway 109-1. Moreover, the sensors 106-4 through 106-7 can detect one or more road actors from the recorded sensor data and observational data in their field of view, as similarly performed during stage (B).

In some implementations, the sensors 106-4 through 106-7 can analyze the recorded sensor data and observational data to attempt to identify activity that may be occurring on the dedicated roadway 109-1. The sensors 106-4 through 106-7 can analyze the recorded data to determine whether activity occurs based on the request provided the sensor 106-12. For example, the activity can include an accident that occurred on the dedicated roadway 109-1, reduced lane markings in appearance on the dedicated roadway 109-1, an appearance of a construction zone on the dedicated roadway 109-1, a derailed train on the railroad 104 which overlaps the dedicated roadway 109-1, one or more trains traversing the railroad 104 which overlaps the dedicated roadway 109-1, and one or more trains traveling towards or away from the portion of the railroad 104 that overlaps the dedicated roadway 109-1. In some examples, the sensors 106-4 through 106-7 can analyze the recorded data to determine whether activity exists in the environment where the railroad 104 runs in parallel to the dedicated roadway 109-1.

In some implementations, the sensors 106 may include one or more trained machine-learning models that can detect one or more activities from sensor data. Specifically, the trained machine-learning models can be configured to detect or identify an object in the input data, e.g., video, LIDAR, RADAR, images, or other data types, detect a specific activity in the input data, and detect one or more individuals in the input data, to name a few examples. Each of the sensors 106 may store these trained machine-learning models and can have these models updated over time by the central server 112.

For example, the sensor 106-4 can include a trained machine-learning model to detect or identify reduced lane markings on the dedicated roadway 109-1. This trained machine-learning model can be a classifier that classifies lines of the dedicated roadway 109-1 as having a reduced appearance. The reduction in appearance can be based on weather, wear and tire, scratch marks, and other causes.

In some examples, the sensor 106-4 can include a trained machine-learning model to detect an accident on the dedicated roadway 109-1. The trained machine-learning model can be trained to detect a vehicular crash, a bike crash, a crash between vehicles, a crash between vehicle and train, or some other accident on the dedicated roadway 109-1. The trained machine-learning model can be trained to detect the crash using image data, audio data, LIDAR data, and/or RADAR data, to name some examples.

Each of the sensors 106 can store the one or more trained machine-learning models and can use the trained machine-learning models to output likelihoods of detection. In response to providing the captured sensor data to the respective trained machine-learning models, the trained machine-learning models can output a likelihood detection of an event, such as a 90% likelihood that the input data depicts a vehicular accident. In response, the corresponding sensor can compare the trained machine-learning models likelihood detection output to a threshold value. If the likelihood detection satisfies the threshold, e.g., meets or exceeds, then the sensor can deem a particular activity as identified from the input data. If the likelihood detection does not satisfy the threshold, e.g., falls below, then the sensor can deem a particular activity as not being identified from the input data.

Each of the sensors 106-4 through 106-7 can capture input data and provide the captured input data as inputs through their respective trained machine-learning models to produce a likelihood detection of an event. If the trained machine-learning models output a likelihood that deems a detection is likely, then the corresponding sensors can store data that indicates a particular activity as identified from the input data. This process can be performed in a minimal amount of time in order to ensure the sensor 106-12 can make a quick and efficient determination indicating whether the detected vehicle can access the dedicated roadway 109-1.

During stage (E), each of the sensors 106-4 through 106-7 can generate a package to transmit to the sensor that requested for the generated sensor data in stage (C). In the example of system 100, these sensors can each prepare a package to transmit to sensor 106-12. Each package can include, for example, the sensor data and observational data captured by the corresponding sensor and the detected or not detected activity. In response to each of the sensors 106-4 through 106-7 generating the package, each of the sensors 106-4 through 106-7 can transmit their respective package to the sensor 106-12 over the network 110.

During stage (F), the sensor 106-12 can receive each package from the selected sensors, e.g., sensors 106-4 through 106-7, over network 110. In some examples, each of the sensors 106-4 through 106-7 may transmit their package to the central server 112 for tracking purposes. The central server 112 may store the package data in the railroad right of way database 118. Additionally, the sensors 106-4 through 106-7 may transmit data to the sensor 106-12 that indicates where in memory at the central server 112 the corresponding package is stored. In response, the sensor 106-12 can access the memory from the central server 112 over network 110 to identify and retrieve the package from each respective sensors 106-4 through 106-7.

Moreover, the sensor 106-12 can receive data from the interface system that monitors the railroad 104 and the one or more trains 102. The data can include responses relevant to the request, such as, a predicted time when the train is to reach the dedicated roadway 109-1, a current location of the train 102, a direction of travel of the train 102, a current speed of the train 102, a number of trains currently on the railroad 104, and future schedules of travel for one or more trains 102 on the railroad 104, to name a few examples. The sensor 106-12 can use this information in addition to the package received from each of the selected sensors, e.g., sensors 106-4 through 106-7, in determining whether the autonomous vehicle 108-1 is allowed or denied access to the dedicated roadway 109-1.

During stage (G), the sensor 106-12 can analyze each of the packages from each of the sensors 106-4 through 106-7 to determine an instruction. The sensor 106-12 can determine the instruction that indicates whether the detected vehicle 108-1 is allowed to access the dedicated roadway 109-1 or not allowed to access the dedicated roadway 109-1. The sensor 106-12 can determine whether to allow the detected vehicle 108-1 access to the dedicated roadway 109-1 or not allow access to the dedicated roadway 109-1 based on the presence of one or more activities identified by the requested capture sensors, e.g., sensors 106-4 through 106-7.

For example, the sensor 106-12 can analyze the contents of each of the packages from each of the sensors 106-4 through 106-7. Iteratively, the sensor 106-12 can extract and identify, from the contents of each of the packages, whether the presence of an activity exists on the dedicated roadway 109-1, i.e., an activity that was detected by the requested capture sensors. As previously mentioned, these activities can include, for example, an accident on the dedicated roadway 109-1, reduced lane markings in appearance on the dedicated roadway 109-1, an appearance of a construction zone on the dedicated roadway 109-1, a derailed train on the railroad 104 which overlaps the dedicated roadway 109-1, one or more trains traversing the railroad 104 which overlaps the dedicated roadway 109-1, and one or more trains traveling towards or away from the portion of the railroad 104 that overlaps the dedicated roadway 109-1. Moreover, the sensor 106-12 can analyze the contents received from the interface system to determine whether a train 102 is actively traveling on the railroad 104 towards or on the railroad 104 that overlaps the dedicated roadway 109-1.

If the sensor 106-12 determines that one or more of the requested capture sensors detects one of the specified activities on the dedicated roadway 109-1 or the interface system monitoring the railroad 104 and the trains 102 indicates a train 102 is traveling towards the railroad 104 or on the railroad 104 which overlaps with the dedicated roadway 109-1, then the sensor 106-12 can generate an instruction to indicate that the detected vehicle 108-1 is not allowed to access the dedicated roadway 109-1. Alternatively, if the sensor 106-12 determines that one or more of the requested capture sensors does not detect one of the specified activities on the dedicated roadway 109-1 and the interface system monitoring the railroad 104 and the trains 102 does not indicate a train 102 is traveling on the railroad 104, near the dedicated roadway 109-1, or within a predetermined distance of the railroad 104 on the dedicated roadway 109-1, then the sensor 106-12 can generate an instruction to indicate that the detected vehicle 108-1 is allowed to access the dedicated roadway 109-1. The instruction can include a short command that indicates to the onboard sensor processing system of the autonomous vehicle 108-1 that the sensors 106 have approved or denied the vehicle 108-1's access to the dedicated roadway 109-1.

In some implementations, the sensors 106 can implement one or more actions to ensure vehicle/train collisions and train traffic disruptions are avoided are reduced to a minimum. Specifically, these sensors 106 can take actions to reduce the number of times the autonomous vehicles 108 cross into and exit from the dedicated roadway 109-1. By enabling the autonomous vehicles 108 to access the dedicated roadway 109-1 also increases the possibility of traffic and vehicle disruption. For example, an autonomous vehicle may experience a mechanical issue upon crossing and traversing the dedicated roadway 109-1 and cease movement, which could create a collision with a train. Additionally, an autonomous vehicle 108 may access the dedicated roadway 109-1 based on incorrect or misguided decision making by the sensors 106. Thus, one such example that the sensors can take to reduce risk of traffic or vehicle collision is to activate platooning of autonomous vehicles. In some example, another manner is to ensure the autonomous vehicles 108 reach a particular speed or other vehicle dynamics before accessing the dedicated roadway 109-1.

In some implementations, a sensor, e.g., sensor 106-12, can activate platooning mode of the autonomous vehicles. In the platooning mode, a minimum number of vehicles are required to aggregate to cross into the dedicated roadway 109-1 at one time. In this example, the sensor 106-12 can wait until the minimum number of vehicles 108 that have approached an access point on the dedicated roadway have been identified. In this instance, the aggregated vehicles can line up behind one another and wait until the sensor 106-12 or other sensors provides access to the dedicated roadway 109-1.

In some examples, the sensor 106-12 can determine a platooning size based on the number of times the autonomous vehicles 108 have previously entered into the dedicated roadway 109-1 in a predetermined time period. For example, if the sensor 106-12 determines that the dedicated roadway 109-1 has been accessed a large number of times in the past 24 hours, such as 20 times, then the sensor 106-12 can set the platooning size to a high number, such as 9, for example. In this manner, the sensor 106-12 can ensure that the number of times the dedicated roadway 109-1 is accessed is reduced in order to minimize any risk of potential train or vehicle disruption or collision. Thus, when the sensor 106-12 determines that the platooning size in front of the one or more accessed points of the dedicated roadway 109-1 has been met, e.g., the sensor 106-12 detects that 9 autonomous vehicles positioned in line or in a group and ready to access the dedicated roadway, then the sensor 106-12 can instruct the group of autonomous vehicles to access the dedicated roadway 109-1.

In some examples, if the sensor 106-12 determines that the dedicated roadway 109-1 has been accessed a low number of times in the past 24 hours, such as 2 times, then the sensor 106-12 can set the platooning size to a low number, such as 3 or 2 vehicles. When the dedicated roadway 109-1 has been accessed a low number of times, then the sensor 106-12 can infer a likelihood of potential railroad disruption is low because only a few autonomous vehicles have accessed the dedicated roadway 109-1. However, as the number of gate openings increases throughout the 24-hour period or some other predetermined time period, then the sensors 106 can increase the size of the platooning amount. Thus, a direct relationship exists between the number of dedicated roadway 109-1 accesses and a platoon size of autonomous vehicles.

In some implementations, the sensor 106-12 can compare the number of dedicated roadway 109-1 accesses from the prior predetermined time period to a threshold value. If the number of dedicated roadway 109-1 accesses from the prior predetermined time period satisfy the threshold value, e.g., meet or exceed, then the sensor 106-12 can set the platoon size to the high number, e.g., 11, for example. Alternatively, if the number of dedicated roadway 109-1 accesses from the prior predetermined period does not satisfy the threshold value, e.g., falls below, then the sensor 106-12 can set the platoon size to the low number, e.g., 3, for example. Other examples of platoon size can also be set by the designer of the system.

In some implementations, when sensor 106-12 activates platooning mode, the sensor 106-12 transmits a notification to each other sensors monitoring the entrance of the dedicated roadway 109-1 to activate platooning mode. These sensors can include, for example, sensor 106-8, 106-9, and 106-10. More or fewer sensors that monitor the entrance of the dedicated roadway 109-1 are also possible. These other sensors can receive the notification from the sensor 106-12 and activate the platooning mode.

In the platooning mode, these sensors collectively can work together to identify when the number of autonomous vehicles 108 seeking to access the dedicated roadway 109-1 meets or exceeds the desired amount. One sensor's field of view, e.g., sensor 106-12's field of view, may not be sufficiently large enough to view and identify all vehicles required for the platooning mode. As such, sensor 106-12 can incorporate a number of sensors required for the platooning mode based on its field of view. For example, if the sensor 106-12 determines it can view three unique vehicles in a line at one time and the platooning mode size is nine, then the sensor 106-12 can determine that two other sensors, e.g., sensors 106-1 and 106-2, are required to help sensor 106-12 identify when the platooning mode size has been met. Other examples are also possible. In this instance, the sensor 106-12 can transmit the notification to sensors 106-1 and 106-2 to activate the platooning mode.

In some implementations, the various platooning mode sensors can work together to identify the autonomous vehicles as they approach the dedicated roadway 109-1. Specifically, when one sensor detects a vehicle, e.g., sensor 106-12, that sensor can generate the identity product for that vehicle based on the observed sensor data and notify the other sensors of the generated identity product. When the subsequent sensor detects the vehicle, that sensor can confirm that it sees the same vehicle as the prior sensor using its own generated identity product or that it sees a new vehicle with a different generated identity product. These sensors can then add the matched identity product to a running list of identity products for the platooning vehicles.

Each sensor can produce an identity product for their detected vehicle and can compare their generated identity product to the other identity product generated by another sensor. If a sensor is the first to generate a unique identity product, then the sensors can add that unique identity product to the running list of identity products for the platooning vehicles. If another sensor generates an identity product that matches to the identity product on the list, then that sensor can confirm it is seeing the same vehicle. If a sensor creates an identity product that does not match to any other identity product generated by the other sensors, the sensors can add that unique identity product to the list.

In some implementations, the sensors can pass the list to each other each time a new identity product is added to the list. Once the size of the list satisfies the designated platooned size, e.g., the number of unique identity products matches to or exceeds the designated platooned size, then one or more of the sensors can determine that the platooned size has been met and these autonomous vehicles can now proceed to access the dedicated roadway 109-1. However, these sensors, e.g., sensors 106-12, 106-1, and 106-2, can review the sensor data one final time before enabling the platooned vehicles access to the dedicated roadway 109-1. The reason for the additional check is because a certain amount of time may have passed from the time the activation of vehicle platooning initiated with the sensors to the time the designated platooned size was met. This can include, for example, 5 minutes, 10 minutes, 30 minutes, more time, or less time. Vehicles may have come and gone from the line and during this time period, the train 102 may have traveled a certain amount of distance on the railroad 104.

To ensure the safety of the platooned vehicles accessing the dedicated roadway 109-1 now the platooned size has been met, the sensors can query the railroad interface to identify a status of the train 102 or other trains on the railroad 104. The sensors can receive a response from the railroad interface that includes, for example, a time for an upcoming trip of train 102, any mechanical issues or failures related to train 102, or dynamic characteristics related to a current trip of train 102, e.g., train speed, acceleration, and a train's direction of travel, to name some examples. If the sensors determine that the train is sufficiently far enough away from the dedicated roadway 109-1, and more specifically, that the sensors determine any train 102 on the railroad 104 will not intercept or collide with the platooned vehicles during their access of the dedicated roadway 109-1, then the sensors can allow the platooned vehicles to access the dedicated roadway 109-1. Alternatively, if the sensors determine that a likelihood exists that the platooned vehicles may intersect or collide with an oncoming train during their traversal of the dedicated roadway 109-1, then the sensors can wait until the train has traveled past the dedicated roadway 109-1 before allowing the platooned vehicles to traverse dedicated roadway 109-1. Once the sensors determine the platoon size reaches the threshold size, the sensors can generate data or an instruction that instructs the platooned vehicles to access the dedicated roadway 109-1.

During stage (H), the sensor 106-12 can transmit the generated instruction to the detected vehicle 108-1 and/or the platooned vehicles. Specifically, the sensor 106-12 can transmit the generated instruction to the onboard sensor processing system of the detected vehicle 108-1. In response, the onboard sensor processing system of the autonomous vehicle 108-1 can receive the command and provide the command to the route guidance system of the autonomous vehicle 108-1. The route guidance system, which can produce actions for the vehicle to take while traversing to a destination, can determine an action for the autonomous vehicle 108-1 to take based on the command received from the sensor 106-12. For example, the actions can include accelerate, change lanes, stop, decelerate, turn left, turn right, U-turn, and other actions. In this example, if the command from the sensor 106-12 indicates that the autonomous vehicle 108-1 is denied access to the dedicated roadway 109-1, then the route guidance system of the autonomous vehicle 108-1 can instruct the autonomous vehicle 108-1 to continue traversing down the roadway 109. Alternatively, if the command from the sensor 106-12 indicates that the autonomous vehicle 108-1 is allowed access to the dedicated roadway 109-1, then the route guidance system of the autonomous vehicle 108-1 can instruct the autonomous vehicle 108-1 to switch lanes from the roadway 109 to the dedicated roadway 109-1. In some examples, the onboard sensor processing system of each platooned vehicle can receive the notification and instruct the navigation system of the corresponding vehicle to proceed along its intended route. The intended route can include, for example, a route that traverses through the dedicated roadway 109-1 over or next to the railroad 104.

Each of the sensors 106 can perform the processes performed in stages (A) through (H). Thus, in response to a sensor, such as sensor 106-8, detecting a vehicle in its field of view, the sensor 106-8 can perform the processes described above in stages (A) through (H). This process can be repeated each time a sensor detects a vehicle in its field of view. In this case, a vehicle can receive real-time and up to date instructions in the event that one sensor, e.g., sensor 106-8, indicates the vehicle can access the dedicated roadway 109-1, and a subsequent sensor, e.g., sensor 106-11, indicates the vehicle is denied access to the dedicated roadway 109-1. In this particular example, an accident or some other activity may have occurred on the dedicated roadway 109-1 during the time the vehicle traveled from sensor 106-108 to sensor 106-11. This real-time update can protect the vehicle from accessing a dedicated roadway which may have an issue and can protect the dedicated roadway 109-1 from further disrupting vehicular and/or railway traffic.

In some implementations, when the detected autonomous vehicle 108-1 switches from the roadway 109 to the dedicated roadway 109-1, the detected autonomous vehicle 108-1 can be charged a toll. The toll can charge a customer or owner of the autonomous vehicle 108-1 for utilizing the dedicated roadway 109-1. The toll can include, for example, a radio frequency ID reader, toll plazas, tollbooths, tollhouses, toll stations, toll bars, toll barriers, or tollgates, to name a few examples. Some tolls can be automatically charged and some tolls can be manually charged. In the case of autonomous vehicles, tolls can charge the autonomous vehicles with electronic toll collection equipment which can automatically communicate with the autonomous vehicle's transponder or use automatic vehicle plate recognition to charge the vehicles by debiting corresponding accounts. The charged toll can be used to generate revenue operator without materially adversely impacting the existing rail business. In some examples, the charged toll may be at a higher operating margin than what the railroad operator typically charges for railroad operation.

In some implementations, when the detected autonomous vehicle 108-1 enters the dedicated roadway 109-1, a sensor may detect its presence. For example, sensor 106-4 may detect the autonomous vehicle 108-1's entry to the dedicated roadway 109-1. Sensor 106-4 may determine it is seeing the same vehicle in its field of view as a previous, subsequent sensor, e.g., sensor 106-3. In response, sensor 106-4 can transmit a generated identity product of autonomous vehicle 108-1 to each of the other sensors. In this manner, the other sensors 106 can also seek to determine whether they see one or more similar vehicles in their field of view. This ensures the sensors can track each of the vehicles 108 as they traverse the roadway 109 and the dedicated roadway 109-1. In some implementations, the sensor 106-4 can transmit a notification to the autonomous vehicle 108-1 upon entering the dedicated roadway 109-1 to switch to an enhanced machine-learning model in response to detecting the autonomous vehicle 108-1's entry to the dedicated roadway 109-1.

In some implementations, a marker can signal the entry into the dedicated roadway 109-1. The marker can include, for example, a line on the dedicated roadway 109-1, a sign indicating "Entry into Railroad ROW," a speed bump, and other indicators. The sensors onboard the autonomous vehicle 108-1 can detect the marker, and signify to the route guidance system of its entry into the dedicated roadway 109-1. In some implementations, the onboard sensor system of the autonomous vehicle 108-1 can switch to an enhanced machine-learning model in response to detecting the autonomous vehicle 108-1's entry to the dedicated roadway 109-1 using the marker. In some implementations, the onboard sensor system of the autonomous vehicle 108-1 can switch to an enhanced machine-learning model in response to receiving a notification from the sensors monitoring the dedicated roadway 109-1 to switch its processing capabilities to the enhanced mode.

In some implementations, the onboard sensor system of the autonomous vehicle can set the one or more trained machine-learning models as enhanced in response to detecting its entry into the dedicated roadway 109-1. For example, in response to detecting entry into the dedicated roadway 109-1, the onboard sensor system of the autonomous vehicle 108-1 can perform potential functions including, such as, enabling the one or more trained machine-learning models to receive additional inputs related to the sensor data from sensors monitoring the dedicated roadway 109-1. Generally, accessing and instantiating the one or more enhanced trained machine-learning models enables the autonomous vehicle 108-1 to be better prepared for events occurring on the dedicated roadway 109-1. Specifically, by activating the enhanced trained machine-learning models on the autonomous vehicle 108-1, the onboard sensor system, and the route guidance system can determine actions that are safer and more reliable during the autonomous vehicle 108-1's entire traversal of the dedicated roadway 109-1.

Specifically, in response to setting the one or more trained machine-learning models as enhanced, the onboard sensor system of the autonomous vehicle 108-1 can activate an enhanced machine-learning model for further processing. In some examples, the onboard sensor system can insert the enhanced machine-learning model in cache memory to enable accessing the enhanced machine-learning model on a more frequent basis. In some examples, the onboard sensor system can request the enhanced machine-learning model from the central server 112. In this example, the onboard sensor system can transmit a request to the central server 112 over network 110 for the enhanced machine-learning model and subsequently receive the enhanced machine-learning model in response from the central server 112.

In some implementations, the onboard sensor system of the autonomous vehicle 108-1 can activate one or more sensors for communication purposes. In some implementations, the onboard sensor system of the autonomous vehicle 108-1 can activate one or more sensors for communication in response to activating the enhanced machine-learning model. The one or more sensors for communication purposes can include, for example, Wi-Fi capabilities, cellular capabilities, C-V2X capabilities, and other network communication capabilities. The onboard processing system of the autonomous vehicle 108-1 activates the one or more communication sensors while the autonomous vehicle 108-1 traverses the dedicated roadway 109-1 because the sensors monitoring the dedicated roadway 109-1 can communicate data to the autonomous vehicle 108-1 for navigation.

Specifically, as the autonomous vehicle 108-1 traverses the dedicated roadway 109-1, the autonomous vehicle 108-1 can utilize the data provided by these sensors to support the decision making for the autonomous vehicle 108-1. In some implementations, the onboard sensor system can receive sensor data from the sensors monitoring the dedicated roadway 109-1 and provide the received sensor data to the enhanced machine-learning model to produce an enhanced output. Moreover, the enhanced machine-learning model can also receive sensor data from the sensors onboard the autonomous vehicle 108-1 and data indicative of the vehicle characteristics to augment the decision-making capabilities of the enhanced machine-learning model. The enhanced output can indicate a likelihood of a detected event or a likely action for the autonomous vehicle 108-1 to take while traversing the dedicated roadway 109-1. In response, the onboard sensor system can provide the enhanced output to the route guidance system for generating one or more actions for the autonomous vehicle 108-1 to take.

As illustrated in system 100, sensors 106-4 through 106-7, and subsequently sensors 106-13 through 106-17 shown in FIG. 1B, respectively, can monitor passage of vehicles through the dedicated roadway 109-1. In some implementations, one or more sensors can monitor an entryway of the dedicated roadway 109-1. Specifically, one or more sensors proximate to entry of the dedicated roadway 109-1 can be configured to monitor an entryway of the dedicated roadway 109-1. For example, sensors 106-4 and 106-5 can be configured to monitor the areas that include and are proximate to the marker at the entry of the dedicated roadway 109-1. In this example, sensors 106-4 and 106-5 can have their fields of view cover areas within and proximate to the marker at the entry of the dedicated roadway 109-1. In some examples, other sensors can monitor the entryway on the dedicated roadway 109-1 when the autonomous vehicles enter at different access points.

In some implementations, when sensor 106-4 (i) receives an identity product of feature data from sensor 106-3 and (ii) determines the vehicle seen in its field of view matches to the vehicle seen by sensor 106-3, the sensor 106-4 can be configured to take additional actions. In some implementations, when sensor 106-4 or sensor 106-5 detects an object in its field of view at the entry of the dedicated roadway 109-1, the sensors 106-4 or 106-5 can be configured to take the additional actions. The latter implementation can be performed without sensor 106-3 notifying the sensors 106-4 and 106-5 of a detected vehicle. The additional actions can include, for example, transmitting a notification to the detected vehicle to switch to an enhanced processing mode, notifying other sensors monitoring the dedicated roadway 109-1 of the detection of a vehicle entering the dedicated lane, transmitting a notification to the central server 112 indicating a vehicle has entered the dedicated lane, a combination of the above actions, or a different action.

For example, as illustrated in system 100, sensor 106-4 can detect autonomous vehicle 108-1 approaching the marker at the entryway of the dedicated roadway 109-1 and subsequently entering the dedicated roadway 109-1. In response to detecting the autonomous vehicle 108-1 entering the dedicated roadway 109-1, the sensor 106-4 can transmit a notification to the autonomous vehicle 108-1 to switch to an enhanced processing mode. In some implementations, the autonomous vehicle 108-1 may have switched to the enhanced processing mode prior to receiving the notification from one or more sensors monitoring the dedicated roadway 109-1 or the entryway of the dedicated roadway 109-1. In this implementation, the onboard processing system of autonomous vehicle 108-1 can receive the notification from the sensor 106-4, for example, and in response can transmit a notification to the sensor 106-4 confirming the switch to the enhanced processing mode has been performed.

In response, the sensor 106-4 can transmit a confirmation to each of the sensors monitoring the dedicated roadway 109-1 indicating that the vehicle traversing the dedicated lane has switched to the enhanced processing mode. In this manner, each of the sensors, e.g., sensors 106-4 through 106-7 and 106-8 through 106-17, can ensure that the autonomous vehicle 108-1 is prepared to receive instructions from these sensors. If the sensor 106-4 transmits a notification to the autonomous vehicle 108-1 and does not receive a confirmation back within a predetermined period of time, then the sensor 106-4 can transmit a notification to the central server 112 indicating that the autonomous vehicle that has entered the dedicated roadway 109-1 is not properly communicating. The central server 112 can receive this notification and notify the authorities that a vehicle traversing the dedicated lane may be an at risk vehicle and should be inspected by the authorities for unsafe driving. In this case, the sensors 106-4 through 106-17 can continue to send instructions to the autonomous vehicle 108-1 to cease driving the dedicated roadway 109-1 until the autonomous vehicle 108-1 returns a confirmation message indicating a switch to the enhanced processing mode has been performed.

In some implementations, the sensors 106 can determine that the train 102 has priority over autonomous vehicles 108 for traversing the combined roadway. In some examples, the sensors 106 can set the train 102 as having priority over the autonomous vehicles 108 because the train 102 cannot receive communications from the sensors 106. In some examples, the sensors 106 can set the train 102 as having priority over the autonomous vehicles 108 based on instructions provided from the railroad system or the central server 112.

In some implementations, the central server 112 can store one or more data components and data types of system 100. Specifically, the central server 112 can store the one or more trained machine-learning models housed by the sensors 106 and the different versions of the one or more trained machine-learning models. The central server 112 can store data used to train the machine-learning models in the databases 114 through 118. Moreover, the central server 112 can receive requests from the sensors 106 for retraining the trained machine-learning models, can retrain the trained machine-learning models, and can deploy newly trained machine-learning models to each of the sensors 106. Similarly, the central server 112 can store the one or more trained machine-learning models from each of the vehicles that traverse the roadway 109 and the dedicated roadway 109-1. The central server 112 can store the enhanced machine-learning model used by each of the autonomous vehicles 108 that traverse the dedicated roadway 109-1.

The central server 112 can store each of the abovementioned data components to alleviate the memory constraint required by each of the autonomous vehicles for storing the machine-learning models. In this manner, when the one or more trained machine-learning models are not in use on the autonomous vehicles, they can be stored on the central server 112. When needed, the autonomous vehicles can transmit requests for a specific model or set of models from the central server 112. In some implementations, the central server 112 can store the data related to each of the models in a vehicle database 114.

For example, the vehicle database 114 can store data relating to the autonomous vehicles 108 that traverse the roadway 109 and the dedicated roadway 109-1. The data can be stored in an indexed fashion, in which indexing information identifies a vehicle and associates the index information with data relating to the vehicle. For example, the indexing information can include an IP address, a MAC address, or another address related to a device onboard the vehicle that enables the sensors 106 and the central server 112 to communicate with each of the autonomous vehicles 108.

The data related to the vehicle can include the vehicle make, vehicle model, vehicle color, vehicle classification, data related to vehicle dynamics at different measured time instances while traversing the roadway, the enhanced machine-learning model, one or more trained machine-learning models used by the vehicles, and can include historic information related to the vehicle. The enhanced machine-learning model may be specific to a particular autonomous vehicle. Similarly, the one or more trained machine-learning models may be specific to a particular autonomous vehicle. As such, the central server 112 can track, store, train, and update the various machine-learning models according to specific vehicle configurations. The historic information can include, for example, a number of times the vehicle has accessed the roadway 109, a number of times the vehicle has accessed dedicated roadway 109-1, and a number of times the vehicle has been detected by the sensors 106, to name some examples. Other detection information is also possible.

In some implementations, the central server 112 can also receive requests from one or more of the sensors 106 for notifying the authorities. One or more of the sensors 106 can detect a vehicle that is driving unsafely on the roadway 109 or the dedicated roadway 109-1, has accessed the dedicated roadway 109-1 without authority from one of the sensors 106 monitoring the system 100, has crashed on the roadway 109 or the dedicated roadway 109-1, or is failing to comply with the sensor provided instructions. In response, the one or more of the sensors 106 can transmit a notification to the central server 112 indicating a detected autonomous vehicle is driving unsafely. The central server 112 can receive the notification and notify the proper authorities in response to try and prevent any further accidents or damage to the detected vehicle, to one or more trains 102 that may come in contact with the detected vehicle, or to other vehicles 108 traversing the roadway 109. In this example, the one or more sensors can provide sensor data illustrating the corresponding vehicle, the identity product of the feature data of the detected vehicle as determined by the corresponding sensor data, and other data that represents the detected vehicle traversing unsafely.

In some implementations, the central server 112 can also communicate with a railroad database 116 and a right of way (ROW) database 118. The railroad database 116 can include data related to the activities of train 102 on railroad 104. For example, the activities can include a number of trips taken by the train 102 on railroad 104, actual start times for each trip, actual end times for each trip, planned start times for each trip, planned end times for each trip, future planned trips for the train 102 on railroad 104, profit received for operating the train 102 on railroad 104, contact information for an operator of the train 102, and data identifying a railroad system that manages the train 102 and the railroad 104, to name a few examples.

The data identifying the railroad system that manages the train 102 and the railroad 104 can include data identifying an interface that receives data from an external user or external system for managing the train 102 and the railroad 104. A client device, a computing device, or another device can provide the interface. A user, such as a train station manager, can provide data indicative of the train 102 and the railroad 104 to the interface. In some examples, the railroad system can be a computer system that can provide data indicative of the train 102, data indicative of the railroad 104, data indicative of past trips taken by trains on railroad 104, and data indicative of future trips on the railroad 104. Subsequently, the central server 112, one or more devices in system 100, the sensors 106, and the autonomous vehicles 108 can request for and access data provided the interface.

The data indicative of the train 102 and the railroad 104 that can be received by the interface and subsequently accessed by the various devices and components of system 100 can include, for example, a number of cars connected on train 102, a time for an upcoming trip of train 102, any mechanical issues or failures related to train 102, contact information for a train operator, or dynamic characteristics related to a current trip of train 102, e.g., train speed, acceleration, and a train's direction of travel, to name some examples.

Similarly, the devices and components of system 100 can transmit requests to the interface for information. For example, the sensors 106, the autonomous vehicles 108, and the central server 112 can each transmit a request to the interface for information related to the train 102 and the railroad 104. The request can include, for example, a predicted time when the train 102 is to reach a destination, e.g., a location proximate to the dedicated roadway 109-1 or to an end destination, a current location of train 102, a direction of travel of train 102, a current speed of train 102, and additional status information related to train 102. The sensors 106, the autonomous vehicles 108, and the central server 112 can each receive responses from the interfaces. The responses can include information relevant to the request. For example, the sensors 106 can use the train information provided from the interface to make determinations about instructions indicating whether a detected autonomous vehicle is allowed or denied access to the dedicated roadway 109-1.

In some implementations, the ROW database 118 can store information related to the dedicated roadway 109-1 and the corresponding sensors. This information can include, for example, data identifying sensors that monitor the dedicated roadway 109-1, data identifying inactive sensors and active sensors that are positioned to monitor the dedicated roadway 109-1, and data identifying characteristics of the dedicated roadway 109-1. The data identifying the sensors monitoring the dedicated roadway 109-1 can include, for example, IP addresses, MAC addresses, and hostnames, as well as, the type of sensors included in each of the sensors 106. For example, sensor 106-1 can include a LIDAR system, a video camera, and a Wi-Fi system. The data identifying inactive and active sensors can be, for example, a notification indicating sensors 106-4, 106-5, 106-6, and 106-7 are active. Similarly, this data can indicate that sensor 106-1 is inactive.

The data identifying characteristics of the dedicated roadway 109-1 can include, a number of lanes, a length of the dedicated roadway 109-1, a direction of travel for each lane, a frequency of use for the dedicated roadway 109-1, one or more access points on the dedicated roadway 109-1 for entrance and exit to the roadway 109, and data related to the toll charged amount for using the dedicated roadway 109-1. The data related to the toll charged amount can include, for example, a total amount of toll charged, a total amount of tolls received from the autonomous vehicles, a total amount of tolls not received from the autonomous vehicles, data identifying the transponders of the autonomous vehicles, and contact information related to the owner of the autonomous vehicles.

The central server 112 can use the data related to the toll charged stored in the ROW database 118 to charge users that own the autonomous vehicles 108 that drive on the dedicated roadway 109-1 and do not pay upon entry. Specifically, the central server 112 can transmit a request for pay to the contact information of the owner for the charged toll amount plus a fee for not paying the toll upon entry of the dedicated roadway 109-1. The central server 112 can receive the payment amount from the owner in response to transmitting the request to the owner, e.g., via cash, a check, a payment application, and payment through a website, to name some examples. Similarly, the central server 112 can obtain payment information related to railroad 104 usage. The payment information can include an amount the railroad management system charges for a train 102 to use the railroad 104.

As such, the central server 112 can determine financial amounts related to tolls charged to vehicles and financial amounts related to trains traversal of railroad 104. The central server 112 can produce analytics that describe, for example, profits related to using both the roadway 109, the at-grade crossings, and the railroad 104, profits related to the individual usage of the roadway 109, the railroad 104, and profit margins related to the usage of the roadway 109 and the railroad 104. Other examples are also possible.

Figure 1B:
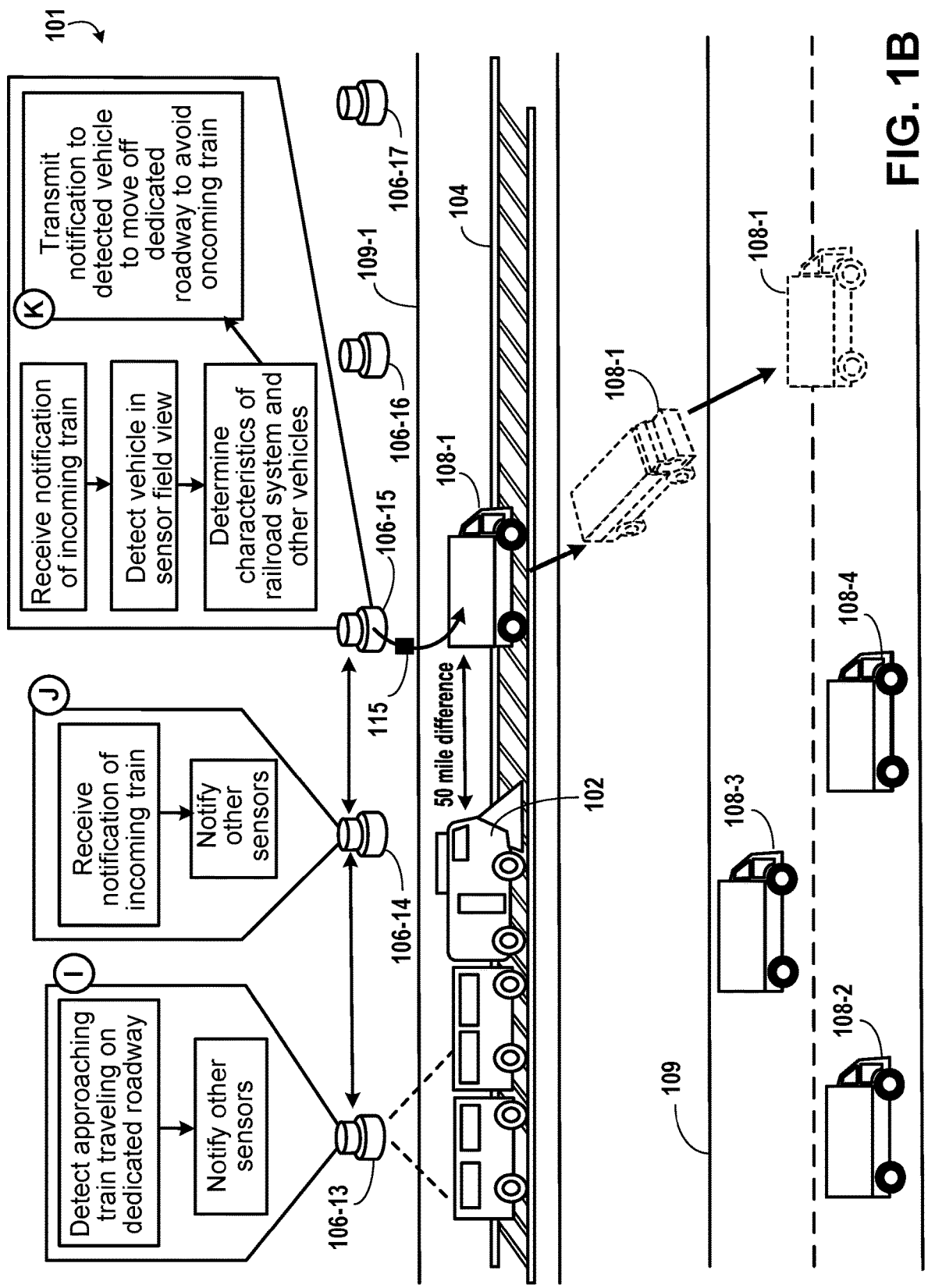
FIG. 1B is another block diagram that illustrates an example of a system for allowing autonomous vehicles access or egress for a dedicated roadway.

FIG. 1B is another block diagram that illustrates an example of a system 101 for allowing autonomous vehicles access or egress for a dedicated roadway. For example, the system 101 is a continuation of system 100. Thus, the functions described with respect to system 101 can also be performed in system 100, and vice versa. Specifically, the system 101 can illustrate transitioning an autonomous vehicle 108-1 from the dedicated roadway 109-1 to the roadway 109 to avoid an oncoming train 102. FIG. 1B illustrates various operations in stages (I) through (K), which can be performed in the sequence indicated, in another sequence, with additional stages, or fewer stages. The stages (I) through (K) can follow the stages of (A) through (H) of FIG. 1A.

During stage (I), the sensors 106-13, 106-14, 106-15, 106-16, and 106-17 can monitor the dedicated roadway 109-1. In some implementations, the sensors 106-13 through 106-17 can monitor the dedicated roadway 109-1 and the railroad 104. The sensors 106 can include omni-directional capabilities for recording sensor data, which can include image data, video data, LIDAR data, RADAR data, and data recorded from other sensor types, to name a few examples.

These sensors can process the sensor data to identify events detected in the sensor data on a frame-by-frame basis based on their field of view. For example, as illustrated in system 101, the sensor 106-13 can obtain sensor data of its environment, such as a portion of the dedicated roadway 109-1 that includes the railroad 104. In some examples, when the railroad 104 runs in parallel to the dedicated roadway 109-1, the sensor 106-13 can obtain sensor data of a portion of the dedicated roadway 109-1 and a portion of the railroad 104. The sensor data can illustrate various events. The events can include, for example, a vehicle in the dedicated roadway 109-1, a train on the railroad 104 over top the dedicated roadway 109-1, an object blocking the dedicated roadway 109-1 or the railroad 104, and other event types. The sensor 106-13 can also receive data of an event from other sensors, e.g., sensors 106-1 through 106-12. The data of an event can include, for example, generated identity product of feature of events seen by the other sensors.

For example, as illustrated in system 101, based on the obtained sensor data and the observational data in the sensor 106-13's field of view, the sensor 106-13 can detect an approaching train 102 traveling on the dedicated roadway 109-1. For example, the sensor 106-13 can detect the train traveling on the railroad 104 overtop the dedicated roadway 109-1, the speed of the train as 60 miles per hour, a direction of the traveling train as west to east, and a number of cars attached to the train. In some examples, the sensor data can illustrate a tree fallen across the road or reduced lane markings on the road. Other examples are also possible. In response to detecting the train 102 and its characteristics, the sensor 106-13 can notify other sensors that monitor the dedicated roadway 109-1. Specifically, the sensors 106-13 can transmit a notification to the other sensors that includes, for example, data indicating the identified train, the generated sensor data, a generated identity product created for the train, a timestamp associated with the sensor 106-13's detection of the event, and data indicating a significance level of the detected event.

The significance level of event can be determined based on how impactful a detected event is to one or more autonomous vehicle traversing on the dedicated roadway 109-1. Specifically, if the event can block the flow of railway or vehicular traffic on the dedicated roadway 109-1, then the sensor 106-13 can label the event as a high significance event. If the event is determined to not block the flow of vehicular or railway traffic on the dedicated roadway 109-1 or to block the flow of vehicular or railway traffic on the dedicated roadway 109-1 momentarily, then the sensor 106-13 can determine a low significance of the event. In some examples, the significance level of the event can be based on a potential amount of money lost during a timeframe of the detected event. In the example of system 101, the sensor 106-13 can determine the significance level of the detected event as high because the train 102 can collide with the autonomous vehicles 108 traversing the dedicated roadway 109-1. Various examples for indicating low or high significance are possible.

During stage (J), the sensor 106-14 can receive the notification from the sensor 106-13 over the network 110. In response to receiving the notification, the sensor 106-13 can process the notification and determine that the transmitting sensor, e.g., sensor 106-13, identified an event and determined the significance level of the event. For example, the sensor 106-14 can determine from the notification an identification of an oncoming train in the dedicated roadway 109-1 and the significance level of the event to be high. The sensor 106-14 can generate sensor data from its field of view to determine whether it also detects the traveling train 102 or another object from the sensor data. If the sensor 106-14 does not detect the traveling train 102 or another object, then the sensor 106-14 can transmit (i) the notification received from sensor 106-13 and (ii) a notification that includes, for example, data indicating no event was detected by the sensor 106-14, the generated sensor data, the generated identity product, a timestamp associated with the sensor 106-14's generated sensor data, and data indicating no significance. By transmitting the data received from the previous sensor(s) and data generated by the current sensor, the next sensor can determine a location of the detected event, e.g., in a field of sensor 106-13 and not in a field of view of sensor 106-14.

During stage (K), the sensor 106-15 can receive the notification from the sensor 106-14 over the network 110. Stage (K) is similar to stages (I) and (J). Similar to previous sensors, the sensor 106-15 can determine from the notification that sensor 106-13 has detected an event and sensor 106-14 does not detect the event. In response, the sensor 106-15 can generate sensor data and determine that it does not detect a similar event of the train 102 traveling on the dedicated roadway 109-1. However, the sensor 106-15 can determine from its sensor data a detected moving vehicle, e.g., autonomous vehicle 108-1, on the dedicated roadway 109-1 and calculate an identity product of the detected vehicle, in response.

In some implementations, the sensor 106-15 can determine a distance of the detected event from a location of the detected vehicle in its field of view. Specifically, the sensor 106-15 can determine a location of the sensor that detected the event based on a longitudinal order of the sensors along the dedicated roadway 109-1 and a distance between each of the sensors. In response, the sensor 106-15 can calculate a distance that the detected vehicle 108-1 is from the detected event, e.g., the moving train, an object on a particular lane of the dedicated roadway 109-1, a train 102 that has fallen onto the dedicated roadway 109-1, an icy portion of the dedicated roadway 109-1, a traffic jam on the dedicated roadway 109-1, a vehicular accident on the dedicated roadway 109-1, or another type of event. For example, as illustrated in system 101, the sensor 106-15 can determine that the distance between the detected event, i.e., detected train 102, and the autonomous vehicle 108-1, e.g., or the field of view of the sensor 106-15, is 50 miles. Moreover, if the sensor 106-15 determines that a spacing between each of the sensors is 25 miles, for example, and the sensor 106-15 that detects the autonomous vehicle 108-1 is two sensors down from its current location, then the sensor 106-15 can determine that the train 102 is approximately 50 miles from the detected autonomous vehicle 108-1. The sensor 106-15 can also determine the speed of the autonomous vehicle 108-1 and the speed of the train 102. Based on the current speed of the autonomous vehicle 108-1, the current speed of the train 102, and the distance of the autonomous vehicle 108-1 to the train 102, the sensor 106-15 can determine specific actions for the vehicle to take to avoid the oncoming train.

For example, the sensor 106-15 can determine actions for the autonomous vehicle 108-1 to take to avoid the oncoming train. Specifically, the sensor 106-15 can transmit a notification 115 to the autonomous vehicle 108-1 to move off the dedicated roadway 109-1 to the roadway 109. For other detected events, the sensors 106-15 can determine and provide other actions for the detected event. For example, the actions can include accelerating, changing lanes, stopping, decelerating, turning left, turning right, making a U-turn, and other actions. As illustrated in system 101, the notification 115 can be received by the onboard sensor processing system of the autonomous vehicle 108-1. Once the sensors no longer detect the previously detected event, e.g., the train is no longer traveling towards or on the dedicated roadway 109-1, then the sensors can communicate with one another indicating that the event is no longer detected.

In response to detecting the event, the onboard sensor processing system of the autonomous vehicle 108-1 can notify the route guidance system of the autonomous vehicle 108-1 to move off the dedicated roadway 109-1 to the roadway 109. Then, the autonomous vehicle 108-1 can travel to the roadway 109 from the dedicated roadway 109-1. In some examples, the autonomous vehicle 108-1 can travel back and forth between the roadway 109 and the dedicated roadway 109-1 at designated points. In response to the train 102 traveling off the railroad 104 that overlaps the dedicated roadway 109-1, the sensors 106 can notify the autonomous vehicle 108-1 that it can move to the dedicated roadway 109-1 by performing stages (A) through (H) of FIG. 1A as previously described.

In some implementations, the autonomous vehicles 108 traversing the dedicated roadway 109-1 can utilize data provided by the sensors 106 monitoring the dedicated roadway 109-1 in conjunction with internally generated sensor data. Specifically, the autonomous vehicles 108 can generate sensor data using its one or more onboard sensors. The sensor data can include, for example, audio data, video data, LIDAR data, radar data, and other data types. The onboard sensor system can utilize the obtained sensor data to identify objects within a nearby environment of the autonomous vehicles 108. In some implementations, the enhanced machine-learning model can utilize the generated sensor data from within the autonomous vehicle 108 and data indicative of the vehicle characteristics in addition to the sensor data provided by the sensors monitoring the dedicated roadway 109-1. The enhanced machine-learning model can receive as input the generated sensor data from the autonomous vehicle 108's internal sensors, data indicative of the vehicle characteristics, e.g., using the vehicle's CANBUS system, and the sensor data provided by the sensors. In response, the enhanced machine-learning model can output a likelihood of a detected event.

In some examples, the enhanced machine-learning model may apply weights to these inputs. The enhanced machine-learning model may apply more weight to the sensor data and inputs supplied by the sensors monitoring the dedicated roadway 109-1 than the sensor data and inputs generated by the autonomous vehicle 108-1's internal sensors. In some examples, the enhanced machine-learning model may apply more weight to the sensor data and inputs generated by the autonomous vehicle 108-1's internal sensors than the sensor data and inputs supplied by the sensors 106. While on the dedicated roadway 109-1, the autonomous vehicle 108-1 can rely more heavily on the external sensors than the internal sensors. In some examples, the enhanced machine-learning model may utilize the inputs generated from the autonomous vehicle 108-1's internal sensors as confirmation of the external sensor's inputs. For example, if the external sensors provide sensor data that indicates for the autonomous vehicle 108-1 to accelerate, then the enhanced machine-learning model can analyze the sensor data from the autonomous vehicle 108-1's internal sensors to confirm that the area ahead of the autonomous vehicle 108-1 is obstacle free.

In some examples, if the external sensors provide sensor data that indicate the autonomous vehicle 108-1 is to take an action but the enhanced machine-learning model determines the sensor data generated by the autonomous vehicle 108-1's internal sensors contradicts the instructed action, then the enhanced machine-learning model can ignore the external sensors provided action. In some examples, if the enhanced machine-learning model determines that the external sensor's instruction and the internal sensors sensor data conflicts, then the onboard sensor system of the autonomous vehicle can generate and provide a notification to the sensor that issued the instruction and to the central server 112 notifying of conflicted instruction. The sensor can receive the notification from the autonomous vehicle 108-1's onboard sensor system and determine a resolution for the conflict with its instruction. The resolution may include, for example, notifying other sensors of the conflicted instruction, notifying the central server 112 of the conflicted instruction, and determining whether other sensors can detect the same event as the sensor that instructed the autonomous vehicle 108-1 to take an action based on the detected event. In some examples, the sensor can transmit a notification to the other sensors to disregard or delete the previous instruction. Similarly, the central server 112 can analyze the notification and determine how to improve the sensors' capabilities.

In response to the enhanced machine-learning model receiving input sensor data, the enhanced machine-learning model can generate an output of a likelihood of a detected event. The onboard sensor system can provide the likelihood of the detected event to the route guidance system of the autonomous vehicle 108-1. The route guidance system can receive the likelihood of the detected event and can produce actions for the vehicle to take while traversing the path on the dedicated lane.

In some implementations, the sensor 106-15 can notify the railroad system and the central server 112 in response to detecting an event on the dedicated roadway 109-1 that includes the railroad 104. Specifically, the sensor 106-15 can notify the railroad system and the central server 112 so these systems are prepared for the financial loss caused by the event's potential disruption. For example, in response to determining that an autonomous vehicle 108-1 may collide with the train 102 on the railroad 104, the sensor 106-15 can transmit a notification to the interface of the railroad system and the central server 112 to warn of disruption. Moreover, the sensor 106-15 can indicate in the notification that the vehicle has notified to move off the dedicated roadway 109-1 to avoid collision with the train 102. By taking this action, the profit generation for the railroad system may drop because the railroad 104 and/or the dedicated roadway 102-1 are not being utilized. In order to offset the lost profits, such as when the dedicated roadway 109-1 is blocked by train traffic, then the railroad system can increase the number of trains that run on the railroad 104 during that time to help offset the lost profits due to the lack of tolls being collected. Similarly, if the railroad 104 is blocked by an event for an extended period of time, e.g., a large train 102 traversing the railroad 104, then the central server 112 can instruct the tolls on the dedicated roadway 109-1 to increase the toll costs to help offset the lost profits from the dedicated roadway 109-1 not being utilized. Other examples are also possible.

In some implementations, the sensors can instruct the autonomous vehicles 108 to take action in response to detecting their exit from the dedicated roadway 109-1.

Specifically, a sensor that detects an autonomous vehicle existing the dedicated roadway 109-1 can, in response, transmit a notification to the autonomous vehicle 108-1 to switch to the normal processing mode. In some examples, a sensor can transmit the notification to the autonomous vehicle 108-1 to switch to the normal processing mode in response to detecting the autonomous vehicle 108-1 crossing a marker that signifies an exit or an end of the dedicated roadway 109-1. In some examples, a sensor can transmit a notification to the autonomous vehicle 108-1 to switch to the normal processing mode in response to detecting that the autonomous vehicle 108-1 satisfies a threshold distance from an end or an exit of the dedicated roadway 109-1.

In some examples, a designer of systems 100 and 101 may designate a threshold distance of 5 feet. A sensor can monitor a distance the autonomous vehicle 108-1 is located from an end of the designated roadway 109-1 or from exiting the dedicated roadway 109-1 by generating sensor data and determining from the generated sensor data, a current distance between the location of the autonomous vehicle 108-1 and an exit location of the dedicated roadway 109-1. The distance can include, for example, a straight-line distance and a distance along the dedicated roadway 109-1 until the marker is met. These sensors can generate sensor data on a frame-by-frame basis to ensure an accuracy in determining when the threshold distance is met between the location of the autonomous vehicle 108-1 and either the end of the dedicated roadway 109-1 or an exit point of the dedicated roadway 109-1. The sensors 106 can indicate the autonomous vehicle 108-1 satisfies the threshold distance when the autonomous vehicle meets or is within the threshold distance.

In some examples, the sensors 106 can monitor when the autonomous vehicle 108-1 crosses the marker signifying the end of the dedicated roadway 109-1 or an exit of the dedicated roadway 109-1. In some examples, the autonomous vehicle 108-1 can be determined to cross the exit when its front tires cross the marker. In some examples, the autonomous vehicle 108-1 can be determined to cross the exit when the entirety of the vehicle has moved past the marker.

In some implementations, the sensors 106 can generate a notification to transmit to the autonomous vehicle 108-1 when exiting the dedicated roadway 109-1. The notification can include an instruction to switch from using the enhanced machine-learning model to the one or more trained machine-learning models. In response to generating the instruction, at least one of the sensors can transmit the generated notification to the onboard sensor processing system of the autonomous vehicle 108-1 over the network 110.

In some implementations, the onboard sensor processing system of the autonomous vehicle 108-1 can receive the generated notification. In response to receiving the generated notification, the onboard sensor system of the autonomous vehicle 108-1 can switch the enhanced machine-learning model to the normal processing mode. In some implementations, the onboard sensor system of the autonomous vehicle 108-1 can switch the enhanced machine-learning model to the normal processing mode in response to detecting its exit of the dedicated roadway 109-1 using one or more of its sensors. For example, in response to detecting the exit of the dedicated roadway 109-1, the onboard sensor system of the autonomous vehicle 108-1 would no longer rely on the one or more trained machine-learning models to receive additional inputs related to the sensor data from sensors monitoring the dedicated roadway 109-1.

In response to switching the enhanced machine-learning model to the normal processing mode, the onboard sensor system of the autonomous vehicle 108-1 can activate the one or more trained machine-learning models for further processing. In some examples, the onboard sensor system can insert the one or more trained machine-learning models in cache memory to enable accessing the one or more trained machine-learning models on a more frequency and rapid basis. In some examples, the onboard sensor system can request the one or more trained machine-learning models from the central server 112. In this example, the onboard sensor system can transmit a request to the central server 112 over network 110 for the one or more trained machine-learning models and subsequently receive the one or more trained machine-learning models in response from the central server 112.

In response to exiting the dedicated roadway 109-1, the autonomous vehicle can continue to traverse the roadway 109 after exiting the dedicated roadway 109-1. Subsequently, the autonomous vehicle can transition back to the dedicated roadway 109-1 at a later point in time. The autonomous vehicle 108-1 can continue traversing the roadway 109 using its route guidance system.

In some implementations, each of the autonomous vehicles includes one or more components that enable these vehicles to operate in a normal driving mode and a railway ROW mode, e.g., an enhanced operation mode. Specifically, the normal driving mode can be activated when the autonomous vehicle traverses the roadway 109. For example, autonomous vehicle 108-1 operates in the normal driving mode when traversing the roadway 109. In some implementations, the railway ROW mode can be activated when the autonomous vehicle traverses the dedicated roadway 109-1. For example, the autonomous vehicle 108-1 operates in railway ROW mode when traversing the dedicated roadway 109-1 that runs in parallel to the railroad 104 or coincides with the railroad 104.

For example, in the normal driving mode, the onboard sensor system of autonomous vehicle 108-1 can obtain sensor data. The sensor data can include sensor data generated by one or more sensors onboard the autonomous vehicle 108-1. The sensor data can include for example, video data, audio data, LIDAR data, radar data, and other data types. The sensor data can illustrate an environment proximate to the autonomous vehicle 108-1 as seen by its sensors. The environment can include, for example, a portion of the roadway proximate to the autonomous vehicle, traffic signs, traffic lights, various types of lanes, objects in the roadway, weather, railroad, and other information. The sensors can obtain sensor data in a continuous or periodic fashion.

The onboard sensor system of the autonomous vehicle 108-1 can obtain vehicle characteristics. For example, the onboard sensor system can communicate with various device of the autonomous vehicle 108-1 utilizing the CAN-BUS system to obtain the vehicle characteristic information. The vehicle characteristic information can include, for example, ABS, cruise control, electric power steering, vehicle dynamics, and battery and recharging systems, to name a few examples.

In response to obtaining the sensor data and the vehicle characteristics, the onboard sensor system can provide the sensor data and the vehicle characteristics as input to the one or more trained machine-learning models. The one or more trained machine-learning models can process the received inputs through each of the nodes in the models. The one or more trained machine-learning models can receive inputs and generate outputs on a continuous basis or each time new input data is obtained by the sensors. In some examples, the one or more trained machine-learning models can include a recurrent neural network (RNN) model. In some examples, the central server 112 can train the one or more RNN machine-learning models using the data stored in the vehicle database 114, the railroad database 116, ROW database 118, and other databases that store images utilized for object detection. In some examples, the central server 112 can iteratively train the one or more RNN machine-learning models based on feedback from the sensors monitoring the roadway and sensors onboard the autonomous vehicles.

In response to providing the sensor data and the vehicle characteristics as inputs to the trained machine-learning models, the one or more trained machine-learning models can output a likelihood detection of an event. For example, the one or more trained machine-learning models can output a detection of 4% of a detected object in the proximity of the autonomous vehicle 108-1. Similarly, the one or more trained machine-learning models can be configured to output a classification of one or more objects identified in the sensor data and other detected events in the sensor data.

The route guidance system of the autonomous vehicle 108-1 can receive the likelihood detection of an event from the one or more trained machine-learning models. The route guidance system can receive the inputs from the vehicle characteristics. The route guidance system can include one or more algorithmic processes that can monitor a location of a vehicle in real time, e.g., via geographic coordinate system (GPS), and map the location of the vehicle on a digital map. For an autonomous vehicle, the route guidance system can ensure the autonomous vehicle follows a route guidance from an origin location to a destination location. The route guidance system can produce actions for the vehicle to take while traversing the roadway. The actions can include, for example, accelerate, change lanes, stop, decelerate, turn left, turn right, U-turn, and other actions. The route guidance system can determine one or more actions for the vehicle to take based on the likelihood of detection and the vehicle characteristics. For example, the route guidance system may rely on the vehicle characteristics to determine whether the corresponding vehicle is capable of taking a particular action based on a particular status of the vehicle, e.g., current speed, acceleration, temperature of the vehicle, or other.

Similarly, the route guidance system can determine actions for the autonomous vehicle to make based on the likelihood detection of event. For example, the route guidance system can ensure the autonomous vehicle 108-1 avoids a detected object while traversing to the destination. In this example, the route guidance system can instruct the autonomous vehicle 108-1 to move in the left lane in response to analyzing the likelihood detection of event from the one or more trained machine-learning models.

In some implementations, the autonomous vehicle 108-1 can operate in the railway ROW mode, e.g., enhanced mode, when the autonomous vehicle 108-1 is instructed to switch to using the enhanced machine-learning model. Specifically, the autonomous vehicle 108-1 can switch to using the enhanced machine-learning model when traversing the dedicated roadway 109-1. One or more sensors monitoring the dedicated roadway 10-1 can detect the autonomous vehicle 108-1's entry to the dedicated lane and in response, transmit a notification to the onboard sensor system of the autonomous vehicle 108-1 to switch to using the enhanced machine-learning model.

As the autonomous vehicle 108-1 traverses the dedicated roadway 109-1 using the enhanced machine-learning model, e.g., under the railroad ROW mode, the onboard sensor system of the autonomous vehicle 108-1 can receive a notification from one or more sensors. Specifically, the onboard sensor system of the autonomous vehicle 108-1 can receive a notification or sensor data from the sensors monitoring the dedicated roadway 109-1 and provide the received sensor data to the enhanced machine-learning model to produce an output. The notification can include sensor data, e.g., video data, LIDAR data, or radar data, or an instruction that indicates an action for the autonomous vehicle 108-1 to take. More specifically, the action can indicate more detailed characteristics, such as, accelerate for 2 seconds, accelerate until a target speed is met, or decelerate until a target speed is met, to name a few examples.

In response to receiving the instruction from one or more of the sensors monitoring the dedicated roadway 109-1, the onboard sensor system can provide the received notification as input to the enhanced machine-learning model. The onboard sensor system can generate sensor data using sensors internal to the autonomous vehicle 108-1 and provide the internally generated sensor data as input to the enhanced machine-learning model. The onboard sensor system can provide the internally generated sensor as input to the enhanced machine-learning model to enhance the accuracy of the enhanced machine-learning model. For example, the enhanced machine-learning model can rely on sensor data from sensors onboard the autonomous vehicle and sensor data from sensors monitoring the dedicated road. In response, the enhanced machine-learning model can produce a likelihood of a detected event. The likelihood of a detected event may include, for example, a percentage or statistical likelihood of a detected event or an action for the autonomous vehicle 108-1 to take. The reliance on sensor data from both external and internal sensors is beneficial for at least two reasons.

First, the enhanced machine-learning model can benefit from sensor data that describes an entirety of the dedicated roadway 109-1. The sensor data now includes not just observations gleaned within proximity of the autonomous vehicle but also observations gleaned from the entirety of the roadway. In this manner, the enhanced machine-learning model can produce improved likelihoods or decisions for the autonomous vehicle using more informed sensor data. For example, sensor data from the sensors monitoring the roadway can describe an event of an accident 1 mile from the location of the autonomous vehicle. The autonomous vehicle's internal sensor data may indicate that no obstacles exist within close proximity to the autonomous vehicle, and as such, the enhanced machine-learning model will produce a likelihood of no obstacles on the roadway using the internal sensor data alone. As a result, the route guidance system of the autonomous vehicle will instruct the autonomous vehicle to continue on the same road. However, with the added benefit of sensor data that describes the entirety of the dedicated road, the enhanced machine-learning model can now produce an indication that the autonomous vehicle should navigate a different path because of the obstacle detected one mile ahead. As such, the added sensor data from the external sensor data improves the enhanced machine-learning model's decision capabilities and ultimately, enables the autonomous vehicle to glean observations from the entirety of the dedicated road.

Second, the sensors monitoring the dedicated road can ensure autonomous vehicles traveling the dedicated road make efficient use of the dedicated road. These sensors can identify events and other activities that onboard sensors of the autonomous vehicles cannot identify based on their viewing distance and/or limited range. As such, the sensors can ensure these autonomous vehicles travel an optimum path to their destination by informing of events, activities, or obstacles that may otherwise disrupt their intended path of travel. By doing so, the flow of traffic on the dedicated road can be managed in an orderly and controlled manner.

The onboard sensor system of the autonomous vehicle 108-1 can then provide the output of the enhanced machine-learning model as input to the route guidance system. The route guidance system can determine actions for the autonomous vehicle 108-1 to make in light of the output produced by the enhanced machine-learning model.

Figure 2:
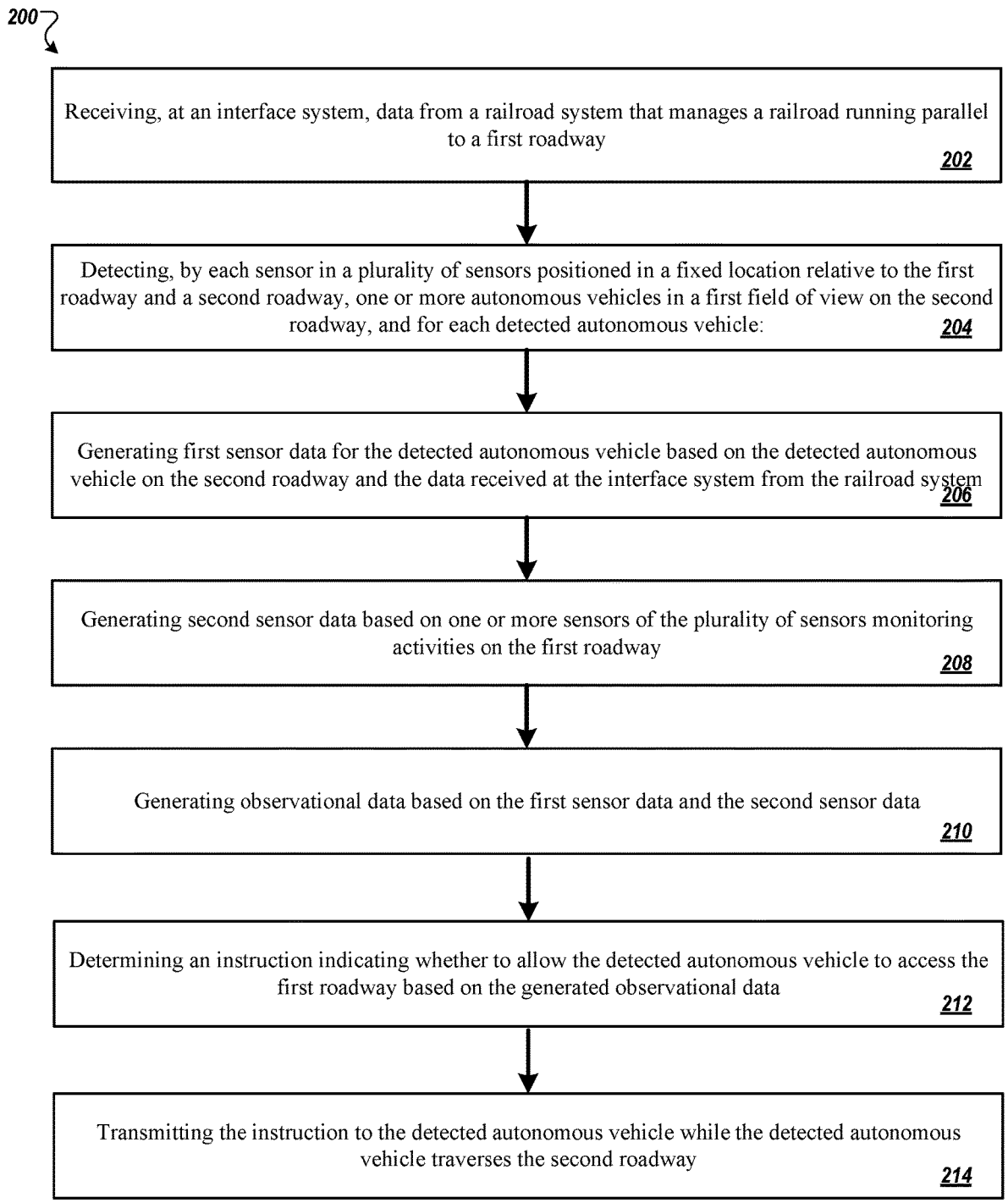
FIG. 2 is a flow diagram that illustrates an example of a process for determining whether to allow autonomous vehicles access or egress for a dedicated roadway.

FIG. 2 is a flow diagram that illustrates an example of a process 200 for determining whether to allow autonomous vehicles access or egress for a dedicated roadway. The sensors, such as sensors 106 and a central server may perform the process 200.

An interface system can receive data from a railroad system that manages a railroad running parallel to a first roadway (202). In some examples, the railroad system can include and/or communicate with the interface system. The interface system can receive from the railroad system and display the railroad specific information. This information can include, for example, characteristics of a train currently traversing the railroad, characteristics of previous trains that have traversed the railroad, characteristics of trains that traversed the railroad that overlaps with the dedicated roadway, a number of railroads, a number of trains, a direction of the traveling trains, and characteristics of the railroad, e.g., a number of railroads and others, to name some examples.

Each sensor from a plurality of sensors is positioned in a fixed location relative to the first roadway and a second roadway, and each sensor can communicate with a central server. Moreover, each sensor can detect one or more autonomous vehicles in a first field of view on the second roadway (204). For example, the plurality of sensors can be positioned longitudinal to the direction of traffic on the first roadway and the second roadway. Each sensor can be placed in the ground at a predetermined distance apart from one another. Additionally, each sensor's field of view can be positioned towards a segment or area of the roadway to detect and monitor vehicles. Similarly, each sensor's field of view can be positioned to monitor characteristics of a railroad that runs in parallel to the second roadway or overtop of the second roadway. For each detected vehicle, the sensors can perform the operations as described below. A sensor can detect a particular vehicle in its field of view. The sensor can use object detection or some form of classification to detect an object in its field of view.

In some implementations, the system can monitor autonomous vehicles on a roadway and determine whether to allow the autonomous vehicles access to a dedicated roadway or to egress the dedicated roadway. In some examples, the roadway or second roadway can include a dedicated roadway or first roadway. In some examples, the roadway can allow the autonomous vehicles to access the dedicated roadway through one or more access points. The one or more access points can include the entirety of the dedicated roadway and the roadway, as these two roadways may run next to one another in parallel. The autonomous vehicles can switch between these two roadways by transitioning or switching between the two roadways at designated points along each roadway's traversal. In some examples, the one or more access points can include specific locations on the dedicated roadway and the roadway where the autonomous vehicles can transition between the two roadways. For examples, these one or more access points can include roadway exits, entryway via charged tolls, left or right turns, some other type, or a combination of the above.

Each sensor can generate first sensor data for the detected autonomous vehicle based on detected autonomous vehicle on the second roadway and the data received at the interface system from the railroad system (206). For example, the first sensor data can include input video data, audio data, images, LIDAR data, radar data, and other data types. The data include recordings of sensor data from different locations on the first or second roadway as seen by the fields of view of each of the sensors and can also include sensor data from different portions of the railroad. The sensor data can correspond to an identification of a vehicle type, characteristics of detected vehicle or vehicles, and vehicle dynamics, to name some examples. The identification of the vehicle type can correspond to, for example, a truck, a sedan, a minivan, a hatchback, an SVU, and others. The identification of the vehicle type can be based on a size of the vehicle. Characteristics of the vehicle can include, for example, vehicle color, vehicle size, wheelbase distance, and length, height, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

Each sensor can identify features of the vehicles it detects and can use the feature data to generate the sensor data. For example, each sensor can identify features of the detected vehicles that include, for example, the vehicle color, e.g., as represented by red-green-blue (RGB) characteristics, the vehicle size, e.g., as calculated through optical characteristics, the vehicle class, e.g., as calculated through optical characteristics, and the volume of the vehicle, as calculated through optical characteristics. In one such example, a sensor can determine that a detected vehicle is the color blue, is over 150 ft$^3$ in volume, has a vehicle type of a sedan, and is a medium sized vehicle. Other examples are also possible. The sensor can also determine one or more characteristics of the vehicle, such as its rate of speed, the distance away from the sensor, the vehicle's direction of travel, a prior path taken by the vehicle while traversing the roadway, and a number of individuals found in the vehicle, to name a few examples. Based on the generated feature data, the sensor can generate sensor data that includes an identification of a vehicle type, characteristics of detected vehicle or vehicles, vehicular density per unit area, vehicle congestion, vehicle headway, and vehicle dynamics, to name a few examples.

Each sensor can generate second sensor data based on one or more sensors of the plurality of sensors monitoring activities on the first roadway (208). In some implementations, the sensors monitoring the roadway can select one or more sensors monitoring the dedicated roadway. Specifically, in response to acquiring the first sensor data of the autonomous vehicles traversing the roadway after passing at least one of the one or more access points or prior to passing at least one of the one or more access points, the sensors monitoring the roadway can select the one or more sensors monitoring the activity on the dedicated roadway to generate the second sensor data, the one or more sensors being selected based on a location of the one or more sensors proximate to the first roadway, the position being after a location of the detected autonomous vehicles along a direction of travel of the second roadway.

In some implementations, in order for a sensor to be able to provide instructions to the detected autonomous vehicle as to whether it can access the dedicated roadway in a safe manner, the sensor can obtain information as to whether the activity on the dedicated roadway may impede vehicular or train traffic. As such, the sensor can request for sensor data and/or data from one or more specific sensors monitoring the dedicated roadway that illustrates one or more activities occurring. If the sensor obtains sensors and/or activity data that illustrates one or more activities occurring that can cause disruption to vehicle or railroad traffic along the dedicated roadway, then the sensor may deny the detected autonomous vehicle's access to the dedicated roadway. Alternatively, if the activity does not cause disruption to vehicle or railroad traffic along the dedicated roadway or no activity exists, then the sensor can allow the detected vehicle's access to the dedicated roadway.

In some implementations, a sensor can select the one or more sensors monitoring the dedicated roadway based on a current position of the detected autonomous vehicle. For example, the sensor can identify a current location of the detected autonomous vehicle. The current location of the detected autonomous vehicle can be recorded in geographical locational coordinates such as, for example, 31.012265 and −115.492837. In response to identifying the current location of the detected autonomous vehicle, the sensor can select one or more sensors monitoring the dedicated roadway based on their position being located after the geographical location of the detected autonomous vehicle. Further, these sensors are selected based on their location on the dedicated roadway being after the geographical location of the detected autonomous vehicle and along a direction of travel on the roadway and the dedicated roadway. Specifically, the sensor can identify sensors who can obtain activity data from sensors who are located at a position after or ahead of the geographical position of the detected vehicle. For example, the sensor monitoring the roadway can identify one or more can identify sensors monitoring the dedicated roadway, since their geographical locations follow a location of the detected autonomous vehicle along the direction of travel of the two roadways.

In some implementations, the sensor can identify addresses for communicating with sensors that monitor the dedicated roadway. In response, the sensor can generate a request for sensor and activity data from these sensors. The request can include, for example, data identifying the sensor that generated the request, and a request for sensor data and activity data for a predetermined period of time. The predetermined period of time may include an amount of time for capturing sensor data such as, for example, 0.5 seconds, 1 second, 2 seconds, 3 seconds, or another period of time.

The sensor can transmit the generated request to each of the selected sensors that monitor the dedicated roadway. Similarly, the sensor can transmit a request to the interface system that receives and monitors activities of the train and the railroad. The request can include all information relevant to train and railroad activities. This can include, for example, a predicted time when the train is to reach a destination, e.g., a location proximate to one or more at-grade crossings or to an end destination, a current location of train, a direction of travel of train, a current speed of train, and additional status information related to train.

Each sensor can generate observational data based on the first sensor data and the second sensor data (210). Continuing with the example from above, the selected sensors monitoring the dedicated roadway can receive the request, extract data from the request and can capture sensor and observational data in their field of view for the extracted predetermined period of time. Specifically, these selected sensors can generate various observational data that can include, for example, data indicative of the accident on the dedicated roadway, data indicative of the reduced lane markings in the appearance on the first roadway, data indicative of the construction zone on the first roadway, data indicative of the derailed train on the first roadway from the railroad, data indicative of the trains traversing on the railroad on the first roadway, data indicative of the trains traveling towards the portion of the railroad that runs on the first roadway, and generates data indicative of an environment that comprises the first roadway and the second roadway. In some examples, the selected sensors can generate one or more of these observational data types.

In some implementations, the selected sensors can analyze the recorded sensor data and observational data to attempt to identify activity that may be occurring on the dedicated roadway. The selected sensors can analyze the recorded data to determine whether activity occurs based on the request provided the sensor that transmitted the request. For example, the activity can include an accident that occurred on the dedicated roadway, reduced lane markings in appearance on the dedicated roadway, an appearance of a construction zone on the dedicated roadway, a derailed train on the railroad which overlaps the dedicated roadway, one or more trains traversing the railroad which overlaps the dedicated roadway, and one or more trains traveling towards or away from the portion of the railroad that overlaps the dedicated roadway. In some examples, the selected sensors can analyze the recorded data to determine whether activity exists in the environment where the railroad runs in parallel to the dedicated roadway.

In some implementations, the selected sensors can generate a package to transmit to the sensor that originally selected the vehicle. Each package can include, for example, the sensor data and observational data captured by the corresponding sensor and the detected or not detected activity. In response to each of selected sensors generating the package, each of the selected can transmit their respective package to the sensor that originally selected the vehicle over the network.

Each sensor can determine an instruction indicating whether to allow the detected autonomous vehicle to access the first roadway based on the generated observational data (212). Specifically, each of the sensors can determine the instruction by determining a presence of one or more of the activities comprising (i) the accident on the first roadway, (ii) the reduced lane markings in appearance on the first roadway, (iii) the construction zone on the first roadway, (iv) the derailed train on the first roadway from the parallel railroad, (v) the trains traversing on the railroad on the first roadway, and (vi) the trains traveling towards a portion of the railroad that runs on the first roadway. Other examples are also possible. In some examples, in response to determining the presence of the one or more activities, a sensor can determine a first instruction to indicate the detected autonomous vehicle is not allowed to access the first roadway based on the generated observational data. In some examples, in response to determining an absence of each of the one or more aforementioned activities, a sensor can determine a second instruction to indicate the detected autonomous vehicle is allowed to access the first roadway based on the generated observational data.

Each sensor can transmit the instruction to the detected autonomous vehicle while the detected autonomous vehicle traverses the second roadway (214). In response to determining whether the detected autonomous vehicle is able or unable to access the first roadway or the dedicated roadway, one or more of the sensors can transmit the instruction to the detected autonomous vehicle while the detected autonomous vehicle traverses the roadway.

In some implementations, a similar process exists for when a detected autonomous vehicle seeks to exit or egress the dedicated roadway. In this case, the sensors monitoring the dedicated roadway can communicate with sensors monitoring the roadway to determine whether the detected autonomous vehicle can safely access the roadway by exiting the dedicated roadway. Specifically, a sensor monitoring the dedicated roadway can generate third sensor data for the detected autonomous vehicle based on an identification of the detected autonomous vehicle on the dedicated roadway and the data received at the interface system from the railroad system. One or more sensors monitoring both the dedicated roadway and the roadway can generate fourth sensor data. The one or more sensors can generate observational data based on the third sensor data and the fourth sensor data. In response, the one or more sensors can determine a second instruction indicating whether to allow the detected autonomous vehicle to exit the first roadway and access the second roadway based on the generated observational data. The one or more sensors can then transmit the second instruction to the detected autonomous vehicle while the detected vehicle traverses the dedicated roadway. In response to receiving the second instruction, the detected autonomous vehicle can egress the dedicated roadway if the instruction indicates the vehicle can egress or can remain on the dedicated roadway if the instruction indicates the vehicle cannot access the roadway.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   detecting, by a sensor device positioned in a location relative to a roadway, a vehicle in a first field of view on the roadway, the roadway being a dedicated lane proximate to another roadway;
   transmitting, to one or more sensor devices monitoring the other roadway, a request to generate sensor data that comprises observational data at one or more portions of the other roadway;
   receiving, from the one or more sensor devices, data indicative of an absence of activities on the other roadway at the one or more portions;
   determining to allow the detected vehicle to access the other roadway based on the received data; and
   transmitting an instruction to the detected vehicle to navigate from the roadway to the other roadway while the detected vehicle traverses the roadway.

2. The computer-implemented method of claim 1, wherein the detected vehicle comprises an autonomous truck.

3. The computer-implemented method of claim 1, further comprising:
   in response to detecting the vehicle in the first field of view on the roadway, selecting, by the sensor device, the one or more sensor devices from a plurality of sensor devices monitoring the other roadway to generate the sensor data, the one or more sensor devices being selected based on a first location of the detected vehicle and a second location of the one or more sensor devices, wherein the second location of the one or more sensor devices is after the first location of the detected vehicle along a direction of travel on the roadway.

4. The computer-implemented method of claim 1, wherein determining to allow the detected vehicle to access the other roadway based on the received data comprises determining to allow the detected vehicle to access the other roadway in response to determining the received data does not indicate a presence of activities on the other roadway.

5. The computer-implemented method of claim 1, wherein determining to allow the detected vehicle to access the other roadway based on the received data further comprises:
   generating, by the sensor device, sensor data indicative of train activities from a railroad that traverses in parallel to the other roadway;
   determining, by the sensor device, whether the sensor data indicative of the train activities reflects one or more trains traversing the railroad; and
   in response to determining the sensor data reflects an absence of the one or more trains traversing the railroad, determining to allow the detected vehicle to access the other roadway.

6. The computer-implemented method of claim 1, further comprising:
   receiving, from the one or more sensor devices, data indicative of a presence of activities on the other roadway at the one or more portions;
   determining to not allow the detected vehicle to access the other roadway in response to receiving data indicative of the presence of activities on the other roadway;
   generating another instruction for the detected vehicle that indicates the detected vehicle is not allowed to access the other roadway; and
   transmit the other instruction to the detected vehicle to avoid navigating from the roadway to the other roadway.

7. The computer-implemented method of claim 6, wherein determining to not allow the detected vehicle to access the other roadway further comprises:
- generating, by the sensor device, sensor data indicative of train activities from a railroad that traverses in parallel to the other roadway;
- determining, by the sensor device, whether the sensor data indicative of the train activities reflects one or more trains traversing the railroad; and
- in response to determining the sensor data reflects a presence of the one or more trains traversing the railroad, determining to not allow the detected vehicle to access the other roadway.

8. The computer-implemented method of claim 1, wherein determining to allow the detected vehicle to access the other roadway based on the received data comprises:
- determining the observational data indicative of the absence of activities at the one or more portions of the other roadway comprises one or more activities that do not impede with a flow of traffic; and
- in response to determining the one or more activities do not impede with the flow of traffic, determining to allow the detected vehicle to access the other roadway.

9. One or more non-transitory machine-readable media storing instructions that, when executed by one or more processing devices, cause the one or more processing devices to perform operations comprising:
- detecting, by a sensor device positioned in a location relative to a roadway, a vehicle in a first field of view on the roadway, the roadway being proximate to another roadway;
- transmitting, to one or more sensor devices monitoring the other roadway, a request to generate sensor data that comprises observational data at one or more portions of the other roadway;
- receiving, from the one or more sensor devices, data indicative of an absence of activities on the other roadway at the one or more portions;
- determining to allow the detected vehicle to access the other roadway based on the received data; and
- transmitting an instruction to the detected vehicle to navigate from the roadway to the other roadway while the detected vehicle traverses the roadway.

10. The one or more non-transitory machine-readable media of claim 9, wherein the detected vehicle comprises an autonomous truck.

11. The one or more non-transitory machine-readable media of claim 9, further comprising:
- in response to detecting the vehicle in the first field of view on the roadway, selecting, by the sensor device, the one or more sensor devices from a plurality of sensor devices monitoring the other roadway to generate the sensor data, the one or more sensor devices being selected based on a first location of the detected vehicle and a second location of the one or more sensor devices, wherein the second location of the one or more sensor devices is after the first location of the detected vehicle along a direction of travel on the roadway.

12. The one or more non-transitory machine-readable media of claim 9, wherein determining to allow the detected vehicle to access the other roadway based on the received data comprises determining to allow the detected vehicle to access the other roadway in response to determining the received data does not indicate the presence of activities on the other roadway.

13. The one or more non-transitory machine-readable media of claim 9, wherein determining to allow the detected vehicle to access the other roadway based on the received data further comprises:
- generating, by the sensor device, sensor data indicative of train activities from a railroad that traverses in parallel to the other roadway;
- determining, by the sensor device, whether the sensor data indicative of the train activities reflects one or more trains traversing the railroad; and
- in response to determining the sensor data reflects an absence of the one or more trains traversing the railroad, determining to allow the detected vehicle to access the other roadway.

14. The one or more non-transitory machine-readable media of claim 9, further comprising:
- receiving, from the one or more sensor devices, data indicative of a presence of activities on the other roadway at the one or more portions;
- determining to not allow the detected vehicle to access the other roadway in response to receiving data indicative of the presence of activities on the other roadway;
- generating another instruction for the detected vehicle that indicates the detected vehicle is not allowed to access the other roadway; and
- transmit the other instruction to the detected vehicle to avoid navigating from the roadway to the other roadway.

15. The one or more non-transitory machine-readable media of claim 14, wherein determining to not allow the detected vehicle to access the other roadway further comprises:
- generating, by the sensor device, sensor data indicative of train activities from a railroad that traverses in parallel to the other roadway;
- determining, by the sensor device, whether the sensor data indicative of the train activities reflects one or more trains traversing the railroad; and
- in response to determining the sensor data reflects a presence of the one or more trains traversing the railroad, determining to not allow the detected vehicle to access the other roadway.

16. The one or more non-transitory machine-readable media of claim 9, wherein determining to allow the detected vehicle to access the other roadway based on the received data comprises:
- determining the observational data indicative of the absence of activities at the one or more portions of the other roadway comprises one or more activities that do not impede with a flow of traffic; and
- in response to determining the one or more activities do not impede with the flow of traffic, determining to allow the detected vehicle to access the other roadway.

17. A system comprising:
- one or more computer processors; and
- one or more non-transitory machine-readable media storing instructions that, when executed by the one or more computer processors, cause the one or more computer processors to perform operations comprising:
  - detecting, by a sensor device positioned in a location relative to a roadway, a vehicle in a first field of view on the roadway, the roadway being a dedicated lane proximate to another roadway;
  - transmitting, to one or more sensor devices monitoring the other roadway, a request to generate sensor data that comprises observational data at one or more portions of the other roadway;

receiving, from the one or more sensor devices, data indicative of an absence of activities on the other roadway at the one or more portions;

determining to allow the detected vehicle to access the other roadway based on the received data; and transmitting an instruction to the detected vehicle to navigate from the roadway to the other roadway while the detected vehicle traverses the roadway.

18. The system of claim 17, wherein the detected vehicle comprises an autonomous truck.

19. The system of claim 17, comprising:

in response to detecting the vehicle in the first field of view on the roadway, selecting, by the sensor device, the one or more sensor devices from a plurality of sensor devices monitoring the other roadway to generate the sensor data, the one or more sensor devices being selected based on a first location of the detected vehicle and a second location of the one or more sensor devices, wherein the second location of the one or more sensor devices is after the first location of the detected vehicle along a direction of travel on the roadway.

20. The system of claim 17, wherein determining to allow the detected vehicle to access the other roadway based on the received data comprises determining to allow the detected vehicle to access the other roadway in response to determining the received data does not indicate the presence of activities on the other roadway.

* * * * *